US007971909B2

(12) United States Patent
Nakata et al.

(10) Patent No.: US 7,971,909 B2
(45) Date of Patent: Jul. 5, 2011

(54) PIPE JOINT, REFRIGERATION DEVICE, HEAT PUMP HOT WATER SUPPLY DEVICE, CLOSING VALVE, WATER SUPPLY PIPING, METHOD OF CONNECTING PIPING, AND IN-THE FIELD PIPING METHOD

(75) Inventors: Haruo Nakata, Sakai (JP); Hiromune Matsuoka, Sakai (JP); Junichirou Tanaka, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 327 days.

(21) Appl. No.: 12/088,504

(22) PCT Filed: Sep. 29, 2006

(86) PCT No.: PCT/JP2006/319456
§ 371 (c)(1),
(2), (4) Date: Mar. 28, 2008

(87) PCT Pub. No.: WO2007/037367
PCT Pub. Date: Apr. 5, 2007

(65) Prior Publication Data
US 2010/0148502 A1    Jun. 17, 2010

(30) Foreign Application Priority Data

Sep. 30, 2005  (JP) ................................. 2005-289209
Jan. 31, 2006  (JP) ................................. 2006-023471

(51) Int. Cl.
*F16L 19/08*    (2006.01)
(52) U.S. Cl. ............... 285/3; 285/342; 285/343; 29/520

(58) Field of Classification Search .............. 285/3, 249, 285/255, 332.1, 342, 343; 29/890.15, 520
See application file for complete search history.

(56) References Cited

U.S. PATENT DOCUMENTS

| 1,889,778 | A | * | 12/1932 | Dobrick | ........................ 285/342 |
| 2,497,274 | A | * | 2/1950 | Richardson | ........................ 285/3 |
| 2,544,109 | A | * | 3/1951 | Richardson | ........................ 285/3 |
| 2,553,981 | A | * | 5/1951 | Richardson | ........................ 285/3 |

(Continued)

FOREIGN PATENT DOCUMENTS

EP    1 647 753 A1    4/2006

(Continued)

*Primary Examiner* — David E Bochna
(74) *Attorney, Agent, or Firm* — Global IP Counselors

(57) ABSTRACT

A pipe joint and a method of joining pipes using the pipe joint prevent loss of a sleeve, enhance workability in the pipe joining operation, and ensure sealing performance. The pipe joint may be utilized in a refrigerant device, a heat pump hot water supply device, a closing valve and a water supply piping. The method for connecting piping may be used in an in-the filed piping method. The pipe joint includes a joint body, a fastening member such as a nut, and a sleeve. The sleeve is integrated with the fastening member or the joint body before the fastening member is attached to the joint body. When the fastening member is attached to the joint body, the sleeve is cut off and separated from the fastening member or joint body. When the nut is fully attached, the sleeve bites into the pipe, and the pipe is joined to the joint body.

26 Claims, 12 Drawing Sheets

U.S. PATENT DOCUMENTS

| | | | | |
|---|---|---|---|---|
| 2,641,489 A | * | 6/1953 | Hedberg, Jr. | 285/3 |
| 3,025,084 A | * | 3/1962 | Franck | 285/3 |
| 3,290,062 A | * | 12/1966 | Ziherl et al. | 285/3 |
| 3,565,467 A | * | 2/1971 | Haldopoulos et al. | 285/319 |
| 3,743,324 A | * | 7/1973 | Schwarz et al. | 285/3 |
| 4,022,497 A | * | 5/1977 | Kotsakis | 285/4 |
| 4,290,276 A | * | 9/1981 | Knowles | 285/3 |
| 4,944,534 A | * | 7/1990 | Kotyk | 285/4 |
| 6,039,361 A | * | 3/2000 | Meli | 285/342 |
| 6,089,620 A | * | 7/2000 | Mota Lopez et al. | 285/322 |
| 7,066,496 B2 | * | 6/2006 | Williams et al. | 285/3 |
| 7,407,196 B2 | * | 8/2008 | Bennett et al. | 285/3 |
| 7,416,225 B2 | * | 8/2008 | Williams | 285/342 |

FOREIGN PATENT DOCUMENTS

| | | |
|---|---|---|
| JP | 45-1814 U | 1/1970 |
| JP | 49-14515 U | 2/1974 |
| JP | 51-7717 U | 1/1976 |
| JP | 52-85709 A | 7/1977 |
| JP | 60-139988 A | 7/1985 |
| JP | 01-89691 U | 6/1989 |
| JP | 05-240380 A | 9/1993 |
| JP | 11-030368 A | 2/1999 |
| JP | 2003-074768 A | 3/2003 |
| JP | 2005-036947 A | 2/2005 |
| JP | 2005-221013 A | 8/2005 |
| JP | 2005-257127 A | 9/2005 |

* cited by examiner

PIPE JOINT, REFRIGERATION DEVICE, HEAT PUMP HOT WATER SUPPLY DEVICE, CLOSING VALVE, WATER SUPPLY PIPING, METHOD OF CONNECTING PIPING, AND IN-THE FIELD PIPING METHOD

CROSS-REFERENCE TO RELATED APPLICATIONS

This U.S. National stage application claims priority under 35 U.S.C. §119(a) to Japanese Patent Application Nos. 2005-289209, filed in Japan on Sep. 30, 2005, and 2006-023471, filed in Japan on Jan. 31, 2006, the entire contents of which are hereby incorporated herein by reference.

TECHNICAL FIELD

The present invention relates to a pipe joint for joining, for example, a refrigerant pipe, a refrigeration device using the pipe joint, a heat pump hot water supply device using the pipe joint, a closing valve using the pipe joint, a water supply piping, a method for connecting piping, and an in-the-field piping method.

BACKGROUND ART

A pipe joint with which a pipe is inserted into a joint hole of a joint body and then a nut is screwed into the joint body to connect the pipe to the joint hole of the joint body has been known as a pipe joint used for joining of a pipe through which fluid is made to flow into a refrigerant pipe of a refrigeration device, for example. A flareless joint as disclosed by a prior art of Japanese Laid-Open Patent Publication No. 2003-74768 has been frequently adopted as the pipe joint as described above. According to this flareless joint, when a nut is screwed into a joint body, a sleeve is interposed between the joint body and the nut, and the sleeve bites into the outer periphery of the pipe by the screwing, thereby ensuing the sealing performance of the joint portion between the pipe and the joint body.

FIG. 16 shows the flareless joint disclosed in the prior art of Japanese Laid-Open Patent Publication No. 2003-74768. This flareless joint is constructed by a joint body 101, a nut 102, and a sleeve 103 provided between the joint body 101 and the nut 102. When the pipe 104 is joined to the joint body 101, the sleeve 103 is mounted on the outer peripheral surface 104a of the pipe 104. The distal portion 104b of the pipe 104 is inserted into a joint hole 101a of the joint body 101, and the threaded portion 102a of the nut 102 is engaged with the threaded portion 101b of the joint body 101. At this time, the proximal end face 103a of the sleeve 103 receives pressing force from a pressing face 102b of the nut 102, and the distal portion 103b of the sleeve 103 receives pressing force from a taper face 101c of the joint body 101. Therefore, the distal portion 103b of the sleeve 103 bites into the outer peripheral surface 104a, and the pipe 104 of the pipe 104 is connected to the joint hole 101a of the joint body 101. As described above, the flareless joint ensures the sealing performance of the joint portion between the pipe 104 and the joint body 101 by the biting of the sleeve 103 into the pipe 104.

SUMMARY OF THE INVENTION

However, the pipe joint as described above is constructed by the joint body, the nut, and the sleeve, and thus there is a risk that a sleeve, which is a relatively small part, may be lost until a pipe is joined. Furthermore, when a pipe is joined, a sleeve, which is a small part, is assembled to the pipe. This can lower the workability. Furthermore, with respect to the sleeve, the site receiving pressing force and the site biting into the pipe are exposed, and thus when the sleeve is stored as a spare or the sleeve is handled, these sites are liable to scratching. This scratching may adversely affect the sealing performance of the joint portion of the pipe joint.

An objective of the present invention is to provide a pipe joint that prevents loss of a sleeve and ensures the sealing performance of a joint portion while enhancing the workability at the pipe joining operation, a refrigeration device using the pipe joint, etc., a method for connecting piping, etc.

According to one aspect of the present invention, there is provided a pipe joint having a joint body forming a joint hole to join a pipe, a fastening member fastened to the joint body, and a sleeve biting into the outer periphery of the pipe by fastening of the fastening member to the joint body under the state that the pipe is inserted into the joint hole. The sleeve is integrated with the joint body or the fastening member before the fastening member is fastened to the joint body, and it is cut off and separated from the joint body or the fastening member by the fastening of the fastening member to the joint body.

According to this construction, the sleeve which bites into the outer periphery of the pipe by the fastening of the fastening member to the joint body is integrated with the joint body or the fastening member before the fastening member is fastened to the joint body. Therefore, the sleeve is prevented from being lost until the pipe is joined as compared with a case where the sleeve is constructed as a separate body from the joint body or the fastening member like the prior art, and thus it is unnecessary to stock a sleeve as a spare. Furthermore, it is unnecessary to assemble the sleeve when the pipe is joined, so that the workability at the pipe connecting operation is enhanced.

Furthermore, the sleeve is integrated with the joint body or the fastening member, and thus the biting site, etc., of the sleeve is prevented from being exposed from the joint body or the fastening member to the outside. Therefore, when the pipe joint is handled, for example, the biting site of the sleeve into the pipe is prevented from being scratched. Therefore, the sealing performance of the joint portion of the pipe joint is prevented from being degraded by the scratching of the sleeve.

Since the sleeve is cut off and separated from the joint body or the fastening member by the fastening of the joint member to the joint body, the separated sleeve bites into the outer periphery of the pipe and the pipe is connected to the joint hole of the joint body while ensuring the sealing performance of the joint portion as in the case of the conventional construction.

According to another aspect of the present invention, there is provided a refrigeration device in which the pipe joint described above is used for the connection portion of a refrigerant pipe. According to this construction, a refrigeration device is provided in which the loss of a sleeve is prevented, and the sealing performance of the joint portion is ensured while enhancing the workability at the pipe joining operation.

According to a further aspect of the present invention, there is provided a heat pump hot water supply device in which the pipe joint described above is used for the connection portion of a refrigerant pipe. According to this construction, a heat pump hot water supply device is provided in which the loss of a sleeve is prevented, and the sealing performance of the joint portion is ensured while enhancing the workability at the pipe joining operation.

According to a further aspect of the present invention, there is provided a closing valve in which the pipe joint described above is used for the connection portion of a pipe. According to this construction, a closing valve is provided in which the loss of a sleeve is prevented, and the sealing performance of the joint portion is ensured while enhancing the workability at the pipe joining operation.

According to a further aspect of the present invention, there is provided a water supply piping in which the pipe joint described above is used for the connection of a pipe. According to this construction, a water supply piping is provided in which the loss of a sleeve is prevented, and the sealing performance of the joint portion is ensured while enhancing the workability at the pipe joining operation.

According to a further aspect of the present invention, there is provided a piping connecting method for a pipe joint having a joint body having a joint hole formed to join a pipe, a fastening member fastened to the joint body, and a sleeve biting into the outer periphery of the pipe by the fastening of the fastening member to the joint body under the state that the pipe is inserted into the joint hole. Before the fastening member is fastened to the joint body, the sleeve is integrated with the fastening body or the fastening member. The connecting method includes a step of inserting the pipe into the joint hole of the joint body, a step of cutting off and separating the sleeve from the joint body or the fastening member by a fastening operation of the fastening member to the joint body, and a step of making the sleeve bite into the outer periphery of the pipe by the fastening operation of the fastening member to the joint body.

According to this construction, when the pipe is connected to the pipe joint, the pipe is inserted into the joint hole of the joint body. Subsequently, the sleeve which is integrated with the joint body or the fastening member is cut off from the joint body or the fastening member by the fastening operation of the fastening member to the joint body. Then, the separated sleeve bites into the outer periphery of the pipe by the fastening operation of the fastening member to the joint body, whereby the pipe is connected. As described above, the sleeve is integrated with the joint body or the fastening member, the sleeve is prevented from being lost until the pipe is connected, and the workability at the pipe joining operation is enhanced. Furthermore, the sleeve separated by the fastening operation of the fastening member bites into the outer periphery of the pipe by the fastening operation, and thus a method for connecting piping which ensure the sealing performance of the joint portion is provided.

According to a further aspect of the present invention, there is provided an in-the-field piping method in which a piping work is carried out at a pipe job site by using the piping connecting method. According to this construction, the piping work is carried out by the fastening operation of the fastening member to the joint body, etc., so that the piping work is safely and easily performed without using any facilities for brazing, etc.

DETAILED DESCRIPTION OF THE INVENTION

First Embodiment

A first embodiment of a pipe joint according to the present invention will be described with reference to FIGS. 1 to 5.

Figure 1:
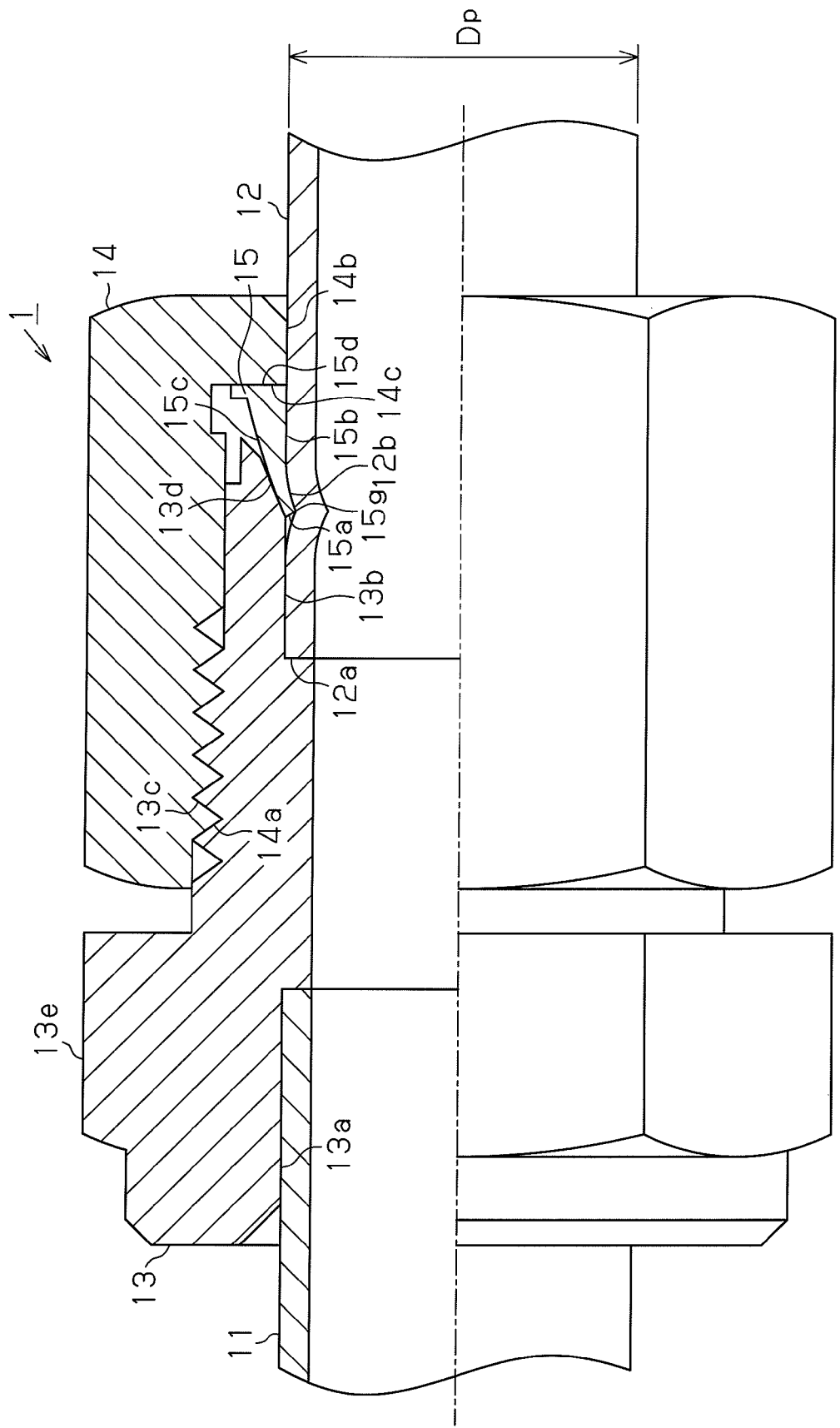
FIG. 1 is a partial cross-sectional view showing the construction of a pipe joint according to a first embodiment.

FIG. 1 is a partial cross-sectional view showing the construction of a pipe joint. The pipe joint 1 connects pipes 11 and 12, and has a joint body 13 having a cylindrical shape into which the pipes 11, 12 are inserted, a nut 14 as a fastening member threaded with the joint body 13, and a sleeve 15 which is interposed between the joint body 13 and the nut 14 at the pipe joining operation and has an annular shape. The pipe 11 is fixed to the joint body 13, for example, by brazing at a socket portion 13a formed at the distal portion of the joint body 13. The distal portion 12a of the pipe 12 to be connected to the joint body 13 is inserted into a joint hole 13b formed at, the proximal portion of the joint body 13. The distal portion 15a of the sleeve 15 bites into the outer peripheral surface 12b of the pipe 12 by the thread engagement between the nut 14 and the joint body 13, whereby the pipe 12 inserted into the joint body 13 is joined to the joint body 13. The sleeve 15 biting into the pipe 12 is integrated with the nut 14 before the pipe 12 is connected, and is cut off and separated from the nut 14 by the thread engagement between the nut 14 and the joint body 13. The thus constructed pipe joint 1 will be hereafter described in detail.

Figure 2:
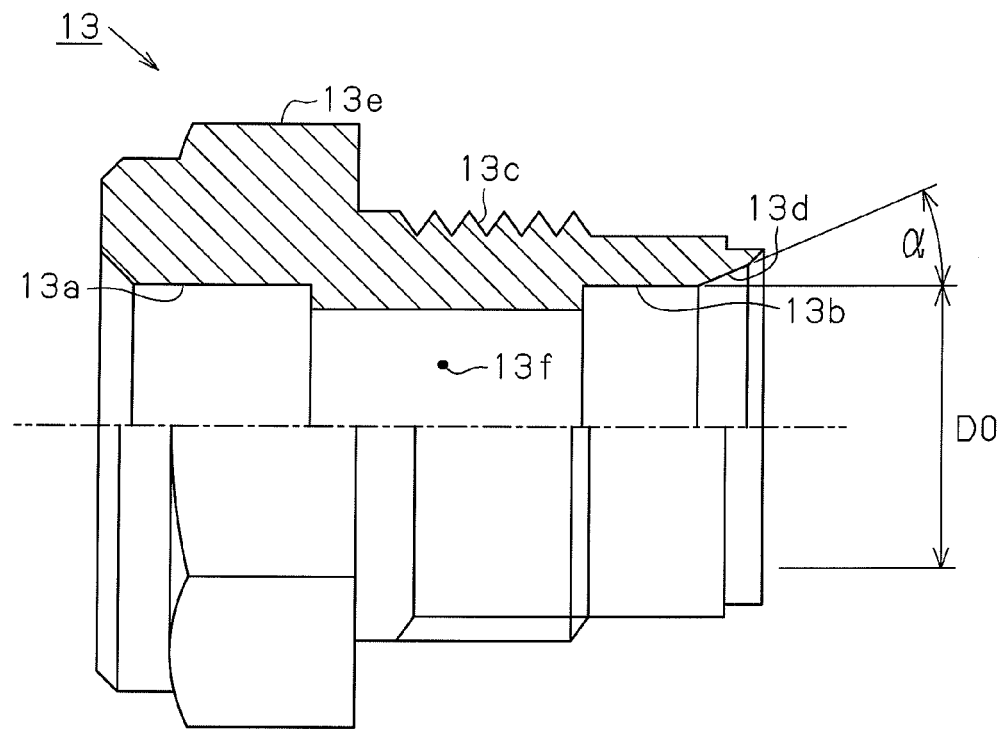
FIG. 2 is a partial cross-sectional view showing a joint body.

FIG. 2 is a partial cross-sectional view showing the joint body 13. The joint body 13 has the socket portion 13a to which the pipe 11 is fixed, the joint hole 13b in which the pipe 12 is inserted, an external thread portion 13c with which the nut 14 is threaded, a guide face 13d, and a nut portion 13e formed on the outer peripheral surface of the joint body 13. The guide face 13d guides the outer peripheral surface 15c of the sleeve 15 when the sleeve 15 bites into the pipe 12.

The socket portion 13a has a circular-hole shape, and has an inner diameter which is substantially equal to the outer diameter of the pipe 11 to be fixed. The joint hole 13b has a circular-hole shape, and has an inner diameter D0 which is substantially equal to the outer diameter Dp of the pipe 12 to be inserted. The socket portion 13a and the joint hole 13b communicate with each other through an inner space 13f. The external thread portion 13c has a threaded shape at the place corresponding to the joint hole 13b and the inner space 13f on the outer peripheral surface of the joint body 13 so that the external thread portion 13c is threaded with the nut 14. The guide face 13d is located at the proximal portion of the joint body 13, that is, the inlet of the pipe 12 in the joint hole 13b, and it expands in diameter from the inner side to the outer side. When the nut 14 is threaded with the joint body 13, the outer peripheral surface 15c of the sleeve 15 is guided by the guide face 13d, and the sleeve 15 bites into the outer peripheral surface 12b of the pipe 12. The joint body 13 is held by the nut portion 13e when the nut 14 is threaded with the joint body 13.

Figure 3:
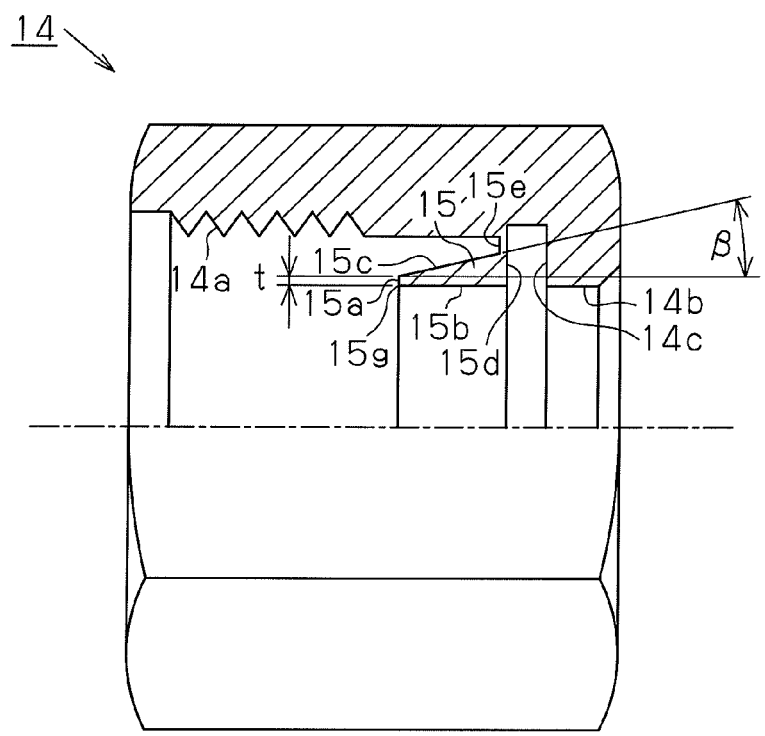
FIG. 3 is a partial cross-sectional view showing a nut.

FIG. 3 is a partial cross-sectional view showing the nut 14. The nut 14 has an internal thread portion 14a to be threaded with the external thread portion 13c of the joint body 13, and a holding hole 14b for holding the outer periphery of the pipe 12. The sleeve 15 is integrated with the nut 14. The internal thread portion 14a is formed on the inner peripheral surface of the distal portion of the nut 14 which is threaded with the joint body 13. The holding hole 14b is formed at the proximal portion of the nut 14, and has a circular-hole shape. Furthermore, the holding hole 14b has an inner diameter which is substantially equal to the outer diameter Dp of the pipe 12 to be held. The sleeve 15 of this embodiment is integrally formed with the nut 14, and formed on the inner peripheral surface of the proximal portion of the nut 14. As shown in FIG. 3, the distal end of the sleeve 15 is located in the nut 14, and the sleeve 15 is prevented from being exposed to the outside from the nut 14. Accordingly, the sleeve 15 is prevented from being scratched when the nut 14 is handled.

The sleeve 15 has an inner peripheral surface 15b facing the pipe 12, an outer peripheral surface 15c as a guided face to be guided by the guide face 13d of the joint body 13 when the sleeve 15 bites into the pipe 12, and a proximal end face 15d receiving pressing force when the sleeve 15 bites into the pipe 12.

The inner peripheral surface 15b has an inner diameter which is substantially equal to the outer diameter Dp of the pipe 12. The outer peripheral surface 15c expands in diameter from the distal end to the proximal end of the sleeve 15. An inclination angle β of the outer peripheral surface 15c relative to a line extending in the fastening direction of the nut 14 is set to be smaller than the inclination angle α of the guide face 13d relative to the same line. Accordingly, when the nut 14 is threaded with the joint body 13, the distal portion 15a of the sleeve 15 is deformed inward and bites into the outer peripheral surface 12b of the pipe 12. Furthermore, the inclination angle β of the outer peripheral surface 15c is set to be larger than the half angle of the inclination angle α of the guide face 13d. Accordingly, the inclination angle β is prevented from being excessively small, and the pressing force from the guide face 13d is efficiently applied to the sleeve 15. The inclination angle α of the guide face 13d of the joint body 13 is preferably set in the range from 15° to 30° to smoothly guide the distal portion 15a of the sleeve 15, and more preferably set in the range from 20° to 25°. The distal end 15g of the sleeve 15 biting into the pipe 12 has a sharp-edge shape. Accordingly, the sleeve 15 reliably bites into the pipe 12, and, the sealing performance at the biting site at which the sleeve 15 bites into the pipe 12 is enhanced.

The proximal end face 15d faces a contact portion 14c formed to be nearer to the distal end of the nut 14 than the holding hole 14b on the inner peripheral surface of the nut 14. The proximal end face 15d receives the pressing force from the contact portion 14c after the sleeve 15 is separated from the nut 14, whereby the distal portion 15a bites into the outer peripheral surface 12b of the pipe 12. As shown in FIG. 3, the sleeve 15 is integrated with the nut 14 at the base portion 15e thereof. The base portion 15e of the sleeve 15 is formed to be thinner. Therefore, the base portion 15e is cut off, and the sleeve 15 is easily separated from the nut 14.

The sleeve 15 is formed of a material the hardness of which is equal to or greater than a material of which the pipe 12 is formed. For example, when the pipe 12 is formed of brass, the sleeve 15 is formed of brass or stainless steel, and when the pipe 12 is formed of stainless steel, the sleeve 15 is formed of stainless steel. Accordingly, the sleeve 15 easily bites into the pipe 12, and the sealing performance at the site at which the sleeve 15 bites into the pipe 12 is enhanced.

Figure 4A:
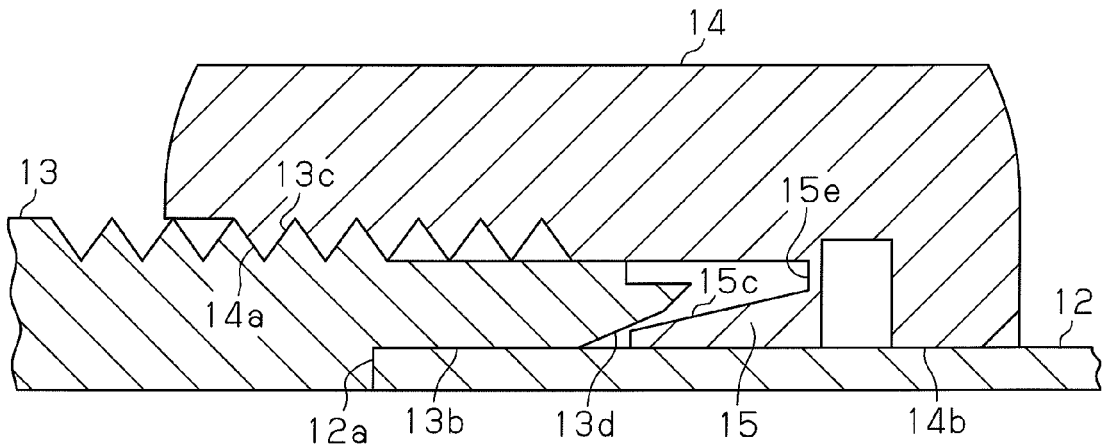
FIG. 4(a) is a cross-sectional view showing a state before a sleeve is cut off.
Figure 4B:
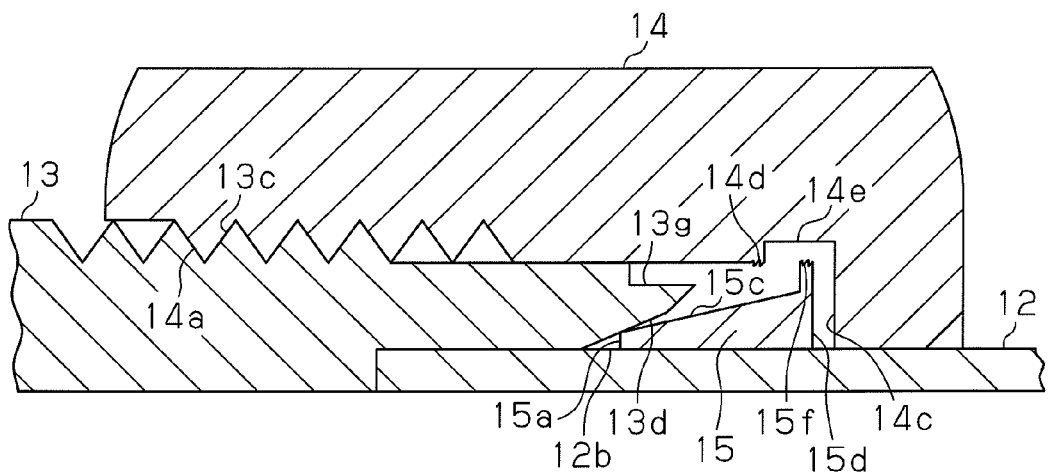
FIG. 4(b) is a cross-sectional view showing a state after the sleeve is separated.
Figure 4C:
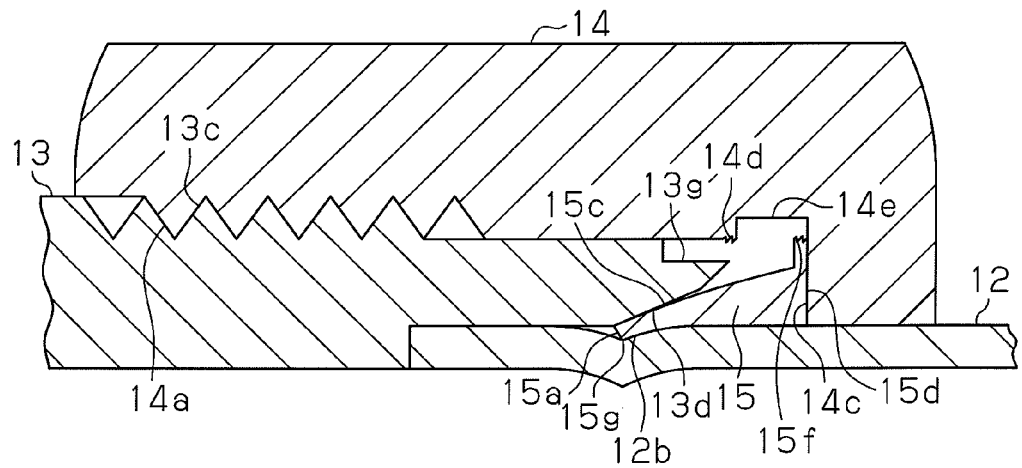
FIG. 4(c) is a cross-sectional view showing a state when the sleeve bites into a pipe.

Next, a method for connecting piping for joining the pipe 12 to the joint body 13 by using the pipe joint 1 will be described. FIGS. 4(a) to 4(c) are cross-sectional views showing the operation of the surrounding of the sleeve 15 of the pipe joint 1. When the pipe 12 is joined to the joint body 13, the pipe 12 is first inserted into the holding hole 14b of the nut 14, and the distal portion 12a of the pipe 12 is inserted into the joint hole 13b of the joint body 13. Then, the internal thread portion 14a of the nut 14 is threaded with the external thread portion 13c of the joint body 13 as shown in FIG. 4(a) under the state that the nut portion 13e of the joint body 13 is held.

When the nut 14 is screwed, the guide face 13d of the joint body 13 abuts against a part of the outer peripheral surface 15c of the sleeve 15, and the pressing force to the outer peripheral surface 15c by the guide face 13d is increased in accordance with the thread engagement of the nut 14. Accordingly, at the base portion 15e of the sleeve 15, shearing force applied along the screwing direction of the nut 14 is increased, and the base portion 15e of the sleeve 15 is cut off. At this time, the cut surface 14d of the nut 14 and the cut surface 15f of the sleeve 15 are formed along the thickness direction of the base portion 15e of the sleeve 15, that is, the screwing direction of the nut 14. As described above, the cut surfaces 14d, 15f are formed along substantially the same direction as the acting direction of the shearing force, and thus the base portion 15e is easily cut off by the screwing of the nut 14. By cutting off the base portion 15e of the sleeve 15, the nut 14 and the sleeve 15 are separated from each other as shown in FIG. 4(b).

When the nut 14 is further screwed, the guide face 13d of the joint body 13 abuts against a part of the outer peripheral surface 15c of the sleeve 15, and the contact portion 14c of the nut 14 abuts against the proximal end face 15d of the sleeve 15. Then, in accordance with the screwing of the nut 14, the proximal end face 15d of the sleeve 15 receives pressing force from the contact portion 14c of the nut 14, and the outer peripheral surface 15c of the sleeve 15 is guided by the guide face 13d of the joint body 13, whereby the distal portion 15a of the sleeve 15 bites into the outer peripheral surface 12b of the pipe 12 as shown in FIG. 4(c).

The cut surface 14d of the nut 14 is distant from the joint body 13 by a back clearance portion 13g formed on the outer peripheral surface of the proximal portion of the joint body 13 from the time when the nut 14 and the sleeve 15 are separated from each other until the time when the sleeve 15 bites into the pipe 12. Likewise, the cut surface 15f of the sleeve 15 is distant from the nut 14 by a recess portion 14e formed to be nearer to the distal end of the nut 14 than the contact portion 14c on the inner peripheral surface of the nut 14. Accordingly, the cut surfaces 14d, 15f are prevented from being brought into contact with the joint body 13 or the nut 14. Thus the nut 14 is sufficiently screwed into the joint body 13, so that the sleeve 15 sufficiently bites into the pipe 12.

As described above, the pipe joint 1 joins the pipe 12 to the joint body 13 by making the distal portion 15a of the sleeve 15 bite into the outer peripheral surface 12b of the pipe 12. At this time, the boundary between the distal portion 15a of the sleeve 15 and the outer peripheral surface 12b of the pipe 12 is hermetically sealed by the biting of the distal portion 15a of the sleeve 15. Furthermore, the outer peripheral surface 15c of the sleeve 15 and the guide face 13d of the joint body 13 are brought into close contact with each other, whereby the boundary between the outer peripheral surface 15c of the sleeve 15 and the guide face 13d of the joint body 13 is hermetically sealed. The sealing performance between the pipe 12 and the joint body 13 is ensured by the hermetical sealing at these places.

Figure 5:
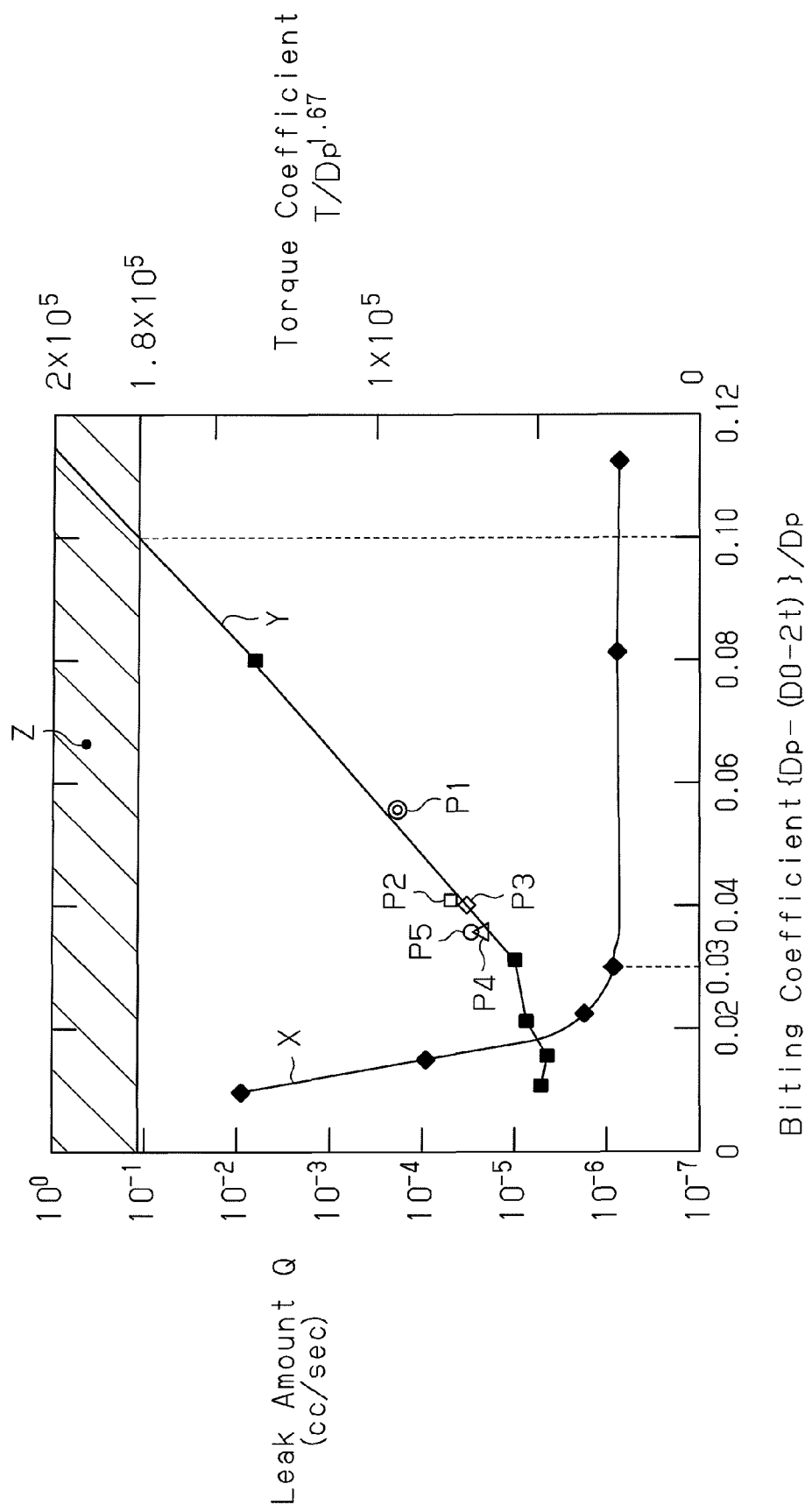
FIG. 5 is a graph showing a leak amount from the joint portion and a torque coefficient with respect to a biting coefficient.

The variation of the sealing performance of the pipe joint 1 in the connecting operation of the pipe 12 and the variation of the fastening torque applied to the joint body 13 of the nut 14 with respect to the variation of the shape of the pipe joint 1 and the pipe 12 were measured, and the relationship as shown in FIG. 5 was obtained. The abscissa axis of FIG. 5 shows the biting coefficient $\{Dp-(D0-2t)\}/Dp$, which is set by using the outer diameter Dp of the pipe 12, the inner diameter D0 of the joint hole 13b of the joint body 13, and the thickness t in the radial direction of the distal portion 15a of the sleeve 15 (see FIG. 3). (D0−2t) shows the inner diameter obtained by subtracting the thickness 2t of the biting site of the sleeve 15 into the pipe 12 from the inner diameter D0 of the joint hole 13b of the joint body 13. It can be assumed that the pipe 12 having the outer diameter Dp is inserted into the site having this inner diameter in the joining operation of the pipe 12. Therefore, $\{Dp-(D0-2t)\}$ represents the biting amount of the distal portion 15a of the sleeve 15 into the pipe 12. The biting coefficient $\{Dp-(D0-2t)\}/Dp$ may be used as a parameter representing the biting ratio of the sleeve 15 to the pipe 12.

X in FIG. 5 represents the variation of the sealing performance of the pipe joint 1 with respect to the variation of the biting coefficient. The ordinate axis represents the leak amount Q (cc/sec) from the joint portion of the pipe 12. The leak amount Q from the joint portion is obtained by filling the pipe 12 and the pipe joint 1 with helium and measuring the leak amount of helium by a helium leak tester when the pressure of helium is set to 4.2 MPa. The biting coefficient varies because the outer diameter Dp is fixed to φ9.52 mm, the inclination angle α is fixed to 20°, the inclination angle β is fixed to 15° and the thickness t is changed in the range from 0.1 to 0.6 mm. With respect to the leak amount Q, as the biting coefficient increases, that is, the biting ratio of the sleeve 15 increases, the leak amount Q decreases as shown in X of FIG. 5. When the biting coefficient is equal to 0.03 or more, the leak amount Q is equal to substantially zero, and it is equal to a value not more than the measurement limit $10^{-6}$ or less of the helium leak tester.

Y of FIG. 5 represents the variation of the fastening torque of the nut 14 with respect to the variation of the biting coefficient. It is known that the fastening torque T of the nut 14 is proportional to 1.67 square of the outer diameter Dp of the pipe 12. Therefore, the ordinate axis represents the torque coefficient $T/Dp^{1.67}$ so as to suppress the effect of the difference of the outer diameter Dp on the fastening torque T. The torque coefficient is calculated from a measurement value at which the maximum fastening torque T is obtained when the nut 14 is fastened so that the leak amount Q is minimum. The biting coefficient varies because the outer diameter Dp is fixed to φ9.52 mm, the inclination angle α is fixed to 20°, the inclination angle β is fixed to 15° and the thickness t is varied in the range from 0.1 to 0.6 mm. As shown in Y of FIG. 5, the torque coefficient increases as the biting coefficient increases, that is, as the biting ratio of the sleeve 15 increases. When the biting coefficient is equal to 0.1 or more, that is, the torque coefficient is equal to $1.8 \times 10^5$ or more, the torque coefficient falls into a screw breaking area Z in which the external thread portion 13c of the joint body 13 or the internal thread portion 14a of the nut 14 is highly likely to be broken.

FIG. 5 shows the variation of the torque coefficient when the outer diameter Dp of the pipe 12 varies and thus the biting coefficient varies. A position P1, at which the outer diameter Dp is equal to φ6.35 mm, a position P2, at which the outer diameter Dp is equal to φ9.52 mm, a position P3, at which the outer diameter Dp is equal to φ12.7 mm, a position P4, at which the outer diameter Dp is equal to φ15.88 mm, and a position P5, at which the outer diameter Dp is equal to φ19.05 mm are located substantially on the line of Y. This demonstrates that the relationship between the biting coefficient and the torque coefficient varies little even when the outer diameter Dp varies.

From the above measurement results, the shapes of the pipe joint 1 and the pipe 12 are set so that the biting coefficient satisfies the following equation (1).

$$0.02 < \{Dp-(D0-2t)\}/Dp < 0.1 \tag{1}$$

That is, when the biting coefficient is set to 0.02 or more, the leak amount Q from the joint portion of the pipe 12 is substantially eliminated. When the biting coefficient is set to 0.1 or less, the threaded portion of the joint body 13 or the nut 14 is prevented from being broken. The relationship between the biting coefficient and the leak amount Q does not vary with respect to the value of the inclination angle α, however, the relationship between the biting coefficient and the torque coefficient varies with respect to the inclination angle α. Therefore, in consideration of the allowance degree of the fastening torque, it is preferable that the biting coefficient ranges from 0.04 to 0.06. By setting the biting coefficient as described above, the sealing performance at the joint portion of the pipe 12 is ensured while preventing the threaded portion of the joint body 13 or the nut 14 from being broken.

The first embodiment described above has the following advantages.

(1) In the first embodiment, the sleeve 15 biting into the outer peripheral surface 12b of the pipe 12 is integrated with the nut 14 before the nut 14 is screwed in the joint body 13. Therefore, as compared with the case where the sleeve 15 is constructed as a separate body from the nut 14, the sleeve 15 is prevented from being lost until the pipe 12 is joined. Therefore, it is unnecessary to stock the sleeve 15 as a spare. Furthermore, the sleeve 15 is integrated with the nut 14, and thus the work of assembling the sleeve 15 is unnecessary when the pipe 12 is joined to the joint body 13, so that the workability in the connecting operation of the pipe 12 is enhanced. The sleeve 15 is cut off from the nut 14 by the thread engagement between the nut 14 and the joint body 13, and bites into the outer peripheral surface 12b. Therefore, the sleeve 15 is constructed to be easily cut off, and the pipe 12 is joined to the joint hole 13b of the joint body 13 while ensuring the sealing performance of the joint portion.

(2) In the first embodiment, the sleeve 15 is formed on the inner peripheral surface of the nut 14, and the distal end of the sleeve 15 is located in the nut 14. Therefore, the sleeve 15 is prevented from being exposed to the outside from the nut 14, and the sleeve 15 is prevented from being scratched when the nut 14 is handled. Accordingly, the distal portion 15a or the outer peripheral surface 15c of the sleeve 15 is prevented from being scratched. Thus the sealing performance between the distal portion 15a of the sleeve 15 and the outer peripheral surface 12b of the pipe 12 or the sealing performance between the outer peripheral surface 15c of the sleeve 15 and the guide face 13d of the joint body 13 is maintained.

(3) In the first embodiment, the sleeve 15 is integrally formed with the nut 14. Therefore, the number of parts of the pipe joint 1 is reduced, and the parts management of the pipe joint 1 and the fabrication work of the pipe joint 1 are facilitated.

Furthermore, the external thread portion 13c is formed on the joint body 13, and the internal thread portion 14a is formed on the nut 14. The nut 14 is fastened to the joint body 13 by the thread engagement between the internal thread portion 14a and the external thread portion 13c. Therefore, the sleeve 15 is made to reliably bite into the outer peripheral surface of the pipe 12 by the screwing operation of the nut 14.

(4) In the first embodiment, the cut surfaces 14d, 15f formed by cutting the base portion 15e of the sleeve 15 are formed along the thickness direction of the base portion 15e of the sleeve 15, that is, along the screwing direction of the nut 14. Therefore, the direction of the shearing force acting on the base portion 15e of the sleeve 15 and the direction in which the cut surfaces 14d, 15f are formed are substantially the same, and the base portion 15e is easily cut by screwing the nut 14. Furthermore, the pressing force is prevented from being applied to the cut surfaces 14d, 15f along the fastening direction of the nut 14, and the nut is prevented from being sufficiently fastened due to a sliding load of the cut surfaces 14d, 15f, etc. Thus the sleeve 15 sufficiently bites into the pipe 12.

(5) In the first embodiment, the cut surface 14d of the nut 14 is constructed to be distant from the joint body 13 and the cut surface 15f of the sleeve 15 is constructed to be distant from the nut 14 during the period from the time when the nut 14 and the sleeve 15 are separated from each other until the time when sleeve 15 bites into the pipe 12. Therefore, the cut surfaces 14d, 15f are prevented from contacting the joint body 13 or the nut 14, so that the nut 14 is sufficiently screwed into the joint body 13 and thus the sleeve 15 sufficiently bites into the pipe 12.

(6) In the first embodiment, the sleeve 15 is formed of a material the hardness of which is equal to or higher than that of a material of which the pipe 12 is formed. Therefore, the sleeve 15 easily bites into the pipe 12, and the sealing performance at the biting site at which the sleeve 15 bites into the pipe 12 is enhanced.

(7) In the first embodiment, the distal end 15g of the sleeve 15 biting into the pipe 12 has a sharp-edge shape. Therefore, the sleeve 15 reliably bites into the pipe 12, and the sealing performance at the biting site at which the sleeve 15 bites into the pipe 12 is enhanced.

(8) In the first embodiment, the distal portion 15a of the sleeve 15 bites into the pipe 12, and the distal portion 15a is located at the distal portion of the nut 14. Therefore, the distal portion 15a is easily deformed by the screwing of the nut 14.

(9) In the first embodiment, the guide face 13d presses the outer peripheral surface 15c of the sleeve 15, whereby the sleeve 15 bites into the pipe 12. Therefore, the distal portion 15a of the sleeve 15 is constructed to be gradually deformed in accordance with the screwing of the nut 14. As a result, the screwing torque of the nut 14 is prevented from being excessively large, the nut is reliably fastened and the sleeve 15 is made to reliably bite into the pipe 12.

(10) In the first embodiment, the inclination angle β of the outer peripheral surface 15c of the sleeve 15 is set to be smaller than the inclination angle α of the guide face 13d of the joint body 13. Therefore, the distal portion 15a of the sleeve 15 is easily deformed to the pipe 12. As a result, the sleeve 15 reliably bites into the pipe 12.

(11) In the first embodiment, the inclination angle β of the outer peripheral surface 15c of the sleeve 15 is set to be larger than the half angle of the inclination angle α of the guide face 13d of the joint body 13. Therefore, the inclination angle β is prevented from being excessively small. Thus the pressing force from the guide face 13d is efficiently transmitted to the outer peripheral surface 15c of the sleeve 15.

(12) In the first embodiment, the shapes of the pipe joint 1 and the pipe 12 are set so that the biting coefficient ranges from 0.02 to 0.1. If the biting coefficient is set to be equal to 0.02 or more, the biting ratio of the sleeve 15 in the joining operation of the pipe 12 is increased, and the leak amount Q from the joint portion of the pipe 12 is substantially eliminated. If the biting coefficient is set to 0.1 or less, the biting ratio of the sleeve 15 is prevented from increasing more than necessary and thus the threaded portion of the joint body 13 or the nut 14 is prevented from being broken. Accordingly, the sealing performance at the joint portion of the pipe 12 is ensured while preventing the threaded portion of the joint body 13 or the nut 14 from being broken.

Second Embodiment

Next, a pipe joint according to a second embodiment of the present invention will be described with reference to FIGS. 6(a) to 6(c). In the second embodiment, the construction that the sleeve bites into the outer peripheral surface of the pipe by screwing the nut into the joint body and the pipe is joined to the joint body (see FIG. 1) is the same as the first embodiment. In the second embodiment, the sleeve 25 and the nut 24 are not integrated with each other, but the sleeve 25 and the joint body 23 are integrated with each other. That is, the sleeve 25 is integrated with the joint body 23 before the joining of the pipe 12, and the sleeve 25 is constructed to be cut off and separated from the joint body 23 by screwing the nut 24 as the fastening member into the joint body 23. Furthermore, the sleeve 25 is joined to the joint body 23 by a method such as adhesion or the like, whereby the sleeve 25 is integrated with the joint body 23. In the embodiment described below, the overlapping description of the same constructions as the first embodiment is omitted or simplified.

Figure 6A:
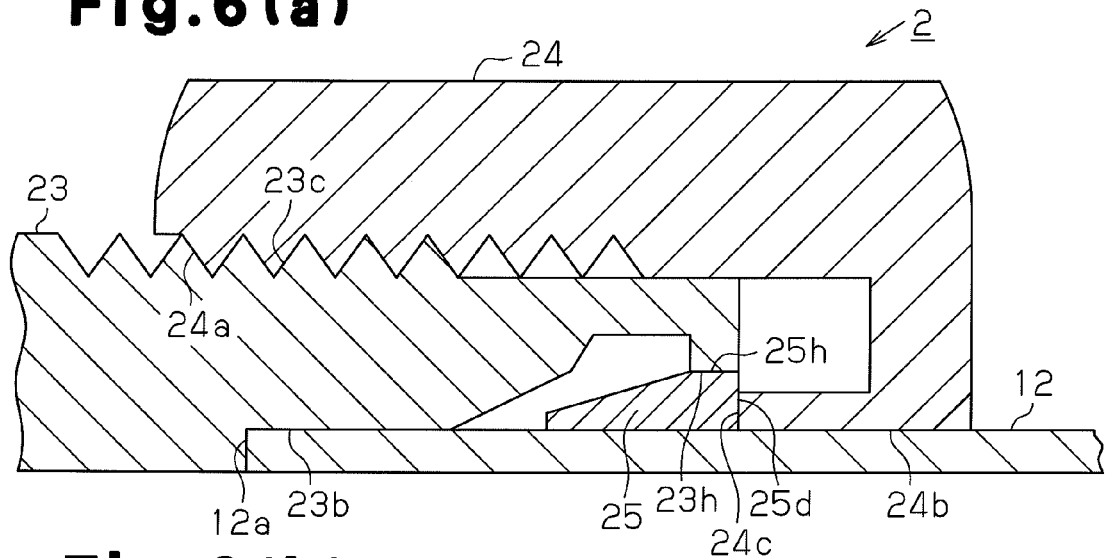
FIG. 6(a) is a cross-sectional view showing a state before a sleeve according to a second embodiment is cut off.
Figure 6B:
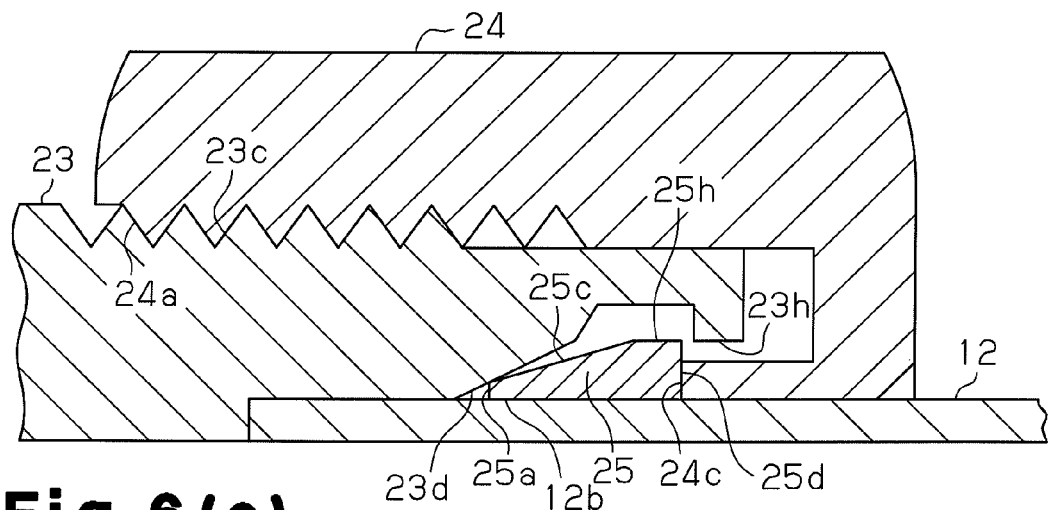
FIG. 6(b) is a cross-sectional view showing a state after the sleeve is separated.
Figure 6C:
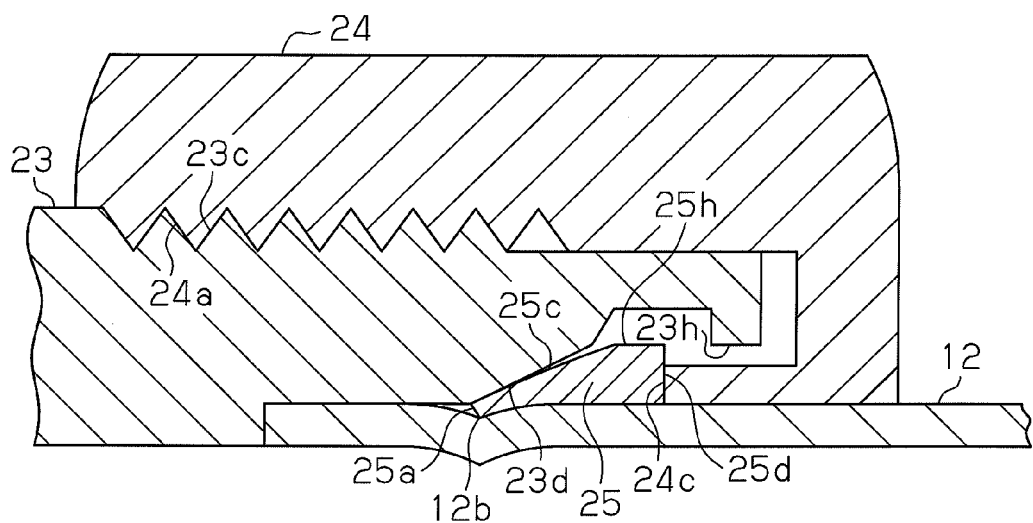
FIG. 6(c) is a cross-sectional view showing a state when the sleeve bites into a pipe.

FIGS. 6(a) to 6(c) are cross-sectional views showing the operation of the surrounding of the sleeve 25 of the pipe joint 2 when the pipe 12 is joined to the joint body 23. As shown in FIG. 6(a), a joint face 25h located at the proximal portion of the sleeve 25 is formed along the screwing direction of the nut 24, and joined to a joint face 23h located at the proximal portion of the joint body 23 by adhesion. The joint face 25h of the sleeve 25 may be fitted in the joint face 23h of the joint body 23 by press-fitting or the like to join the sleeve 25 to the joint body 23. By this joint, the sleeve 25 is integrally assembled to the joint body 23.

A method for connecting piping in which the pipe 12 is joined to the joint body 23 by using the pipe joint 2 will be described. When the pipe 12 is joined to the joint body 23, the pipe 12 is first inserted into the holding hole 24b of the nut 24, and the distal portion 12a of the pipe 12 is inserted into the joint hole 23b of the joint body 23. Then, as shown in FIG. 6(a), the internal thread portion 24a of the nut 24 is threaded with the external thread portion 23c of the joint body 23.

When the nut 24 is screwed into the joint body 23, the contact portion 24c of the nut 24 abuts against the proximal end face 25d of the sleeve 25, and the pressing force thereof increases in accordance with the screwing of the nut 24. Accordingly, at the joint face 25h of the sleeve 25 and the joint face 23h of the joint body 23, the shearing force applied in the screwing direction of the nut 24 increases, and the joint face 25h of the sleeve 25 and the joint face 23h of the joint body 23 are cut off from each other. Therefore, the joint faces 25h and 23h constitute a cut surface. The joint faces 25h, 23h are formed along substantially the same direction as the acting direction of the shearing force, and thus the joint faces 25h, 23h are easily cut off by the screwing of the nut 24. By this cutting, the joint body 23 and the sleeve 25 are separated from each other as shown in FIG. 6(b).

Subsequently, when the nut 24 is further screwed, the guide face 23d of the joint body 23 abuts against a part of the outer peripheral surface 25c of the sleeve 25, and the contact portion 24c of the nut 24 abuts against the proximal end face 25d of the sleeve 25. Then, the proximal end face 25d of the sleeve 25 receives pressing force from the contact portion 24c of the nut 24 in accordance with the screwing of the nut 24, and the outer peripheral surface 25c of the sleeve 25 is guided by the guide face 23d of the joint body 23, whereby the distal portion 25a of the sleeve 25 bites into the outer peripheral surface 12b of the pipe 12 as shown in FIG. 6(c).

As described above, in the pipe joint 2, the distal portion 25a of the sleeve 25 bites into the outer peripheral surface 12b of the pipe 12, whereby the pipe 12 is connected to the joint body 23 while ensuring the sealing performance between the pipe 12 and the joint body 23.

The second embodiment has the following advantages in addition to the advantages (6) to (12) of the first embodiment.

(13) The sleeve 25 of the second embodiment is integrated with the joint body 23 before the nut 24 is screwed into the joint body 23. Therefore, as in the case of the first embodiment, the loss of the sleeve 25 before the pipe 12 is joined is prevented, and thus it is unnecessary to stock the sleeve 25 as a spare. Furthermore, the work of assembling the sleeve 25 when the pipe 12 is joined to the joint body 23 is unnecessary, and thus the workability at the connecting operation of the pipe 12 is enhanced. The sleeve 25 is cut off from the joint body 23 and bites into the outer peripheral surface 12b of the pipe 12 by the thread engagement between the nut 24 and the joint body 23. Therefore, the sleeve 25 is easily cut off, and also the pipe 12 is joined to the joint hole 23b of the joint body 23 while ensuring the sealing performance of the joint portion.

Furthermore, the external thread portion 23c is formed on the joint body 23, and the internal thread portion 24a is formed on the nut 24. The nut 24 is fastened to the joint body 23 so that the internal thread portion 24a is threaded with the external thread portion 23c. Therefore, the sleeve 25 reliably bites into the outer peripheral surface of the pipe 12 by the screwing operation of the nut 24.

(14) The sleeve 25 of the second embodiment is joined to the joint body 23 and integrally assembled to the joint body 23 by adhesion, fitting or other methods. Therefore, in such a case that it is difficult to form the sleeve 25 and the joint body 23 integrally, the sleeve 25 and the joint body 23 can be integrated with each other. Accordingly, the sleeve 25 and the joint body 23 can be integrated with each other while considering the performance of the forming of the sleeve 25 and the joint body 23.

(15) In the second embodiment, the joint face 23h of the joint body 23 and the joint face 25h of the sleeve 25 are formed along the screwing direction of the nut 24. Therefore, the direction of the shearing force applied by the screwing of the nut 24 and the direction of the joint faces 25h, 23h are substantially the same, and the joint faces 25h and 23h are easily cut off by the screwing of the nut 24. Furthermore, the pressing force is prevented from being applied to the joint faces 25h, 23h along the fastening direction of the nut 24. Thus, the nut 24 is sufficiently fastened due to the sliding load of the joint faces 25h, 23h or the like and thus the sleeve 25 sufficiently bites into the pipe 12.

(16) In the second embodiment, the joint face 23h of the joint body 23 is constructed to be distant from the nut 24, and the joint face 25h of the sleeve 25 is constructed to be distant from the joint body 23 during the period from the time when the joint body 23 and the sleeve 25 are separated from each other until the time when the sleeve 25 bites into the pipe 12. Accordingly, the joint faces 25h, 23h are prevented from coming into contact with the joint body 23 or the nut 24. Thus, the nut 24 is sufficiently screwed into the joint body 23, and the sleeve 25 sufficiently bites into the pipe 12.

Third Embodiment

Next, a pipe joint according to a third embodiment of the present invention will be described with reference to FIGS. 7(a) to 7(c). In the first and second embodiments, the pipe is joined to the joint body by the thread engagement between the nut and the joint body. In contrast, in the third embodiment and a fourth embodiment described below, the pipe is joined to the joint body without using any screw structure between the joint body and the nut. In the pipe joints according to the third and fourth embodiments, the sleeve is integrated with the fastening member. The sleeve is cut off from the fastening member by the sliding movement of the fastening member in the axial direction of the pipe, and the separated sleeve bites into the outer peripheral surface of the pipe. The overlapping description of the same constructions as the first embodiment such as the construction that the sleeve bites into the outer peripheral surface of the pipe, etc., is omitted or simplified.

Figure 7A:
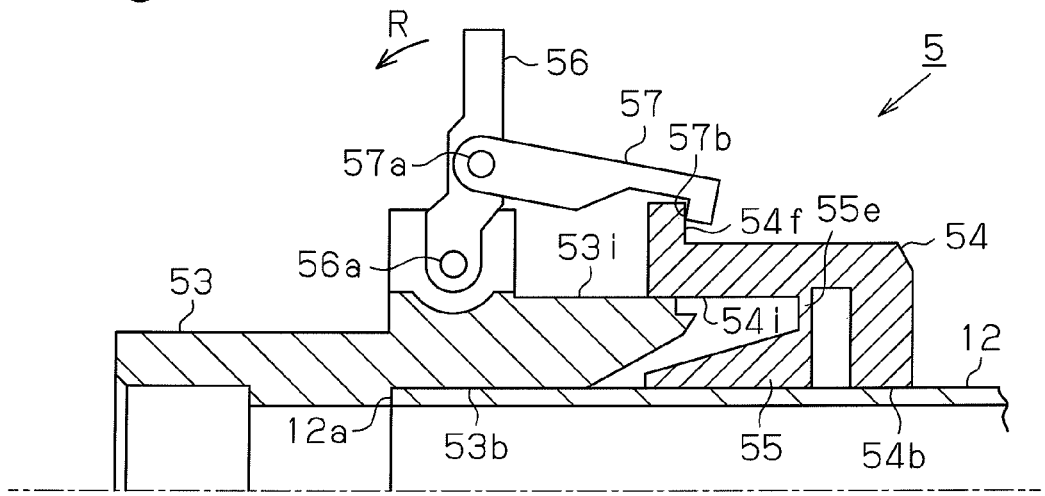
FIG. 7(a) is a cross-sectional view showing a state before a sleeve according to a third embodiment is cut off.
Figure 7B:
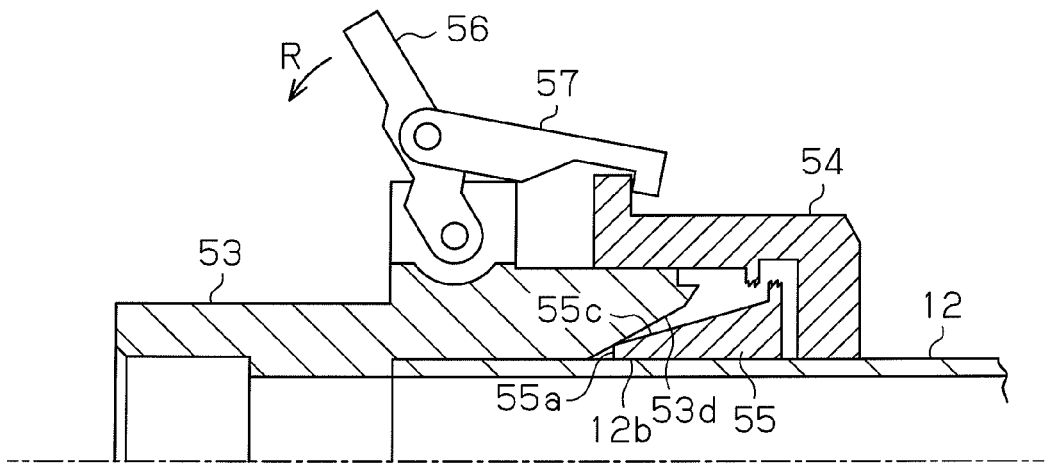
FIG. 7(b) is a cross-sectional view showing a state after the sleeve is separated.
Figure 7C:
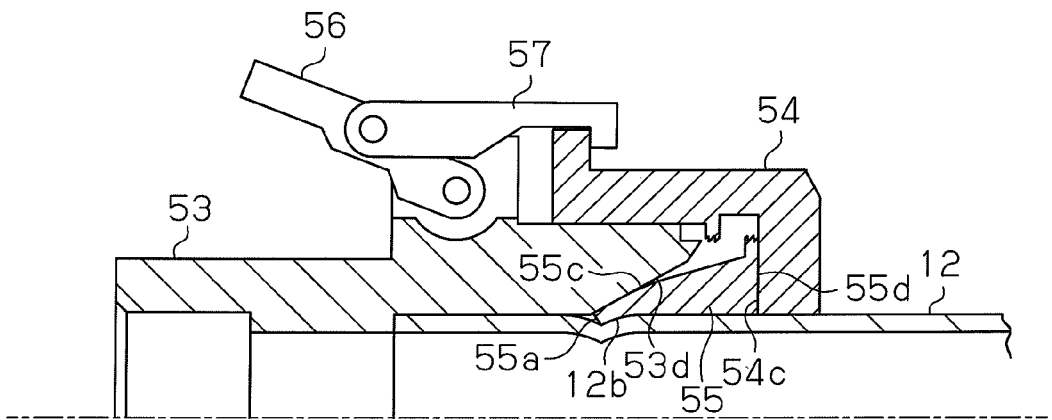
FIG. 7(c) is a cross-sectional view showing a state when the sleeve bites into a pipe.

FIGS. 7(a) to 7(c) are cross-sectional views showing the operation of the pipe joint 5 when the pipe 12 is joined to the joint body 53. FIG. 7(a) shows a state before the pipe 12 is connected by the pipe joint 5. As shown in FIG. 7(a), the pipe joint 5 has a joint body 53 in which the pipe 12 is inserted, a fastening member 54 fastened to the joint body 53, and a sleeve 55 biting into the outer peripheral surface of the pipe 12. The sleeve 55 is integrally formed with the fastening member 54, and the sleeve 55 and the fastening member 54 are joined to each other through a base portion 55e.

A plurality of operating levers 56 are rotatably supported on the outer peripheral surface of the joint body 53. The pivot shaft 56a of each operating lever 56 is formed so as to extend in a direction substantially orthogonal to the axis of the joint body 53. An engaging lever 57 is rotatably supported at the middle portion of each operating lever 56. A pivot shaft 57a of the engaging lever 57 is disposed so as to extend parallel to the pivot shaft 56a of the operating lever 56. An engaging pawl 57b formed at the distal end of the engaging lever 57 is designed so as to be hooked to a projecting portion 54f formed on the outer peripheral surface of the fastening member 54. Furthermore, a sliding face 53i having a circular shape is formed on the outer peripheral surface of the proximal portion of the joint body 53. A sliding face 54i having a circular shape is formed on the inner peripheral surface of the distal portion of the fastening member 54. When the fastening member 54 is fastened to the joint body 53, the sliding face 53i is fitted to the sliding face 54i. The fastening member 54 is designed to be movable in only the axial direction of the joint body 53.

Next, the pipe connecting method for connecting the pipe 12 to the joint body 53 by using the pipe joint 5 will be described. When the pipe 12 is joined to the joint body 53, the pipe 12 is inserted into the holding hole 54b of the fastening member 54, and the distal portion 12a of the pipe 12 is inserted into the joint hole 53b of the joint body 53. As shown in FIG. 7(a), the operating lever 56 is rotated to the distal end of the joint body 53 (in the direction as indicated by arrow R of FIG. 7(a)) under the state that the engaging pawl 57b of the engaging lever 57 is hooked to the projecting portion 54f of the fastening member 54.

When the operating lever 56 is rotated in the direction indicated by arrow R, the fastening member 54 is moved to the joint body 53, so that the guide face 53d of the joint body 53 abuts against a part of the outer peripheral surface 55c of the sleeve 55, and the pressing force thereof increases as the fastening member 54 moves. Accordingly, at the base portion 55e of the sleeve 55, the shearing force applied in the moving direction of the fastening member 54 increases, and the base portion 55e of the sleeve 55 is cut off. Then, as shown in FIG. 7(b), the fastening member 54 is separated from the sleeve 55.

When the operating lever 56 is further rotated in the direction indicated by arrow R, the fastening member 54 is further moved to the joint body 53, so that the guide face 53d of the joint body 53 abuts against a part of the outer peripheral surface 55c of the sleeve 55, and the contact portion 54c of the fastening member 54 abuts against the proximal end face 55d of the sleeve 55. Then, in accordance with the movement of the fastening member 54, the proximal end face 55d of the sleeve 55 receives pressing force from the contact portion 54c of the fastening member 54, and the outer peripheral surface 55c of the sleeve 55 is guided by the guide face 53d of the joint body 53, whereby the distal portion 55a of the sleeve 55 bites into the outer peripheral surface 12b of the pipe 12 as shown in FIG. 7(c).

As described above, in the pipe joint 5, the distal portion 55a of the sleeve 55 bites into the outer peripheral surface 12b of the pipe 12, whereby the pipe 12 is joined to the joint body 53 while ensuring the sealing performance between the pipe 12 and the joint body 53.

The third embodiment described above has the following advantages.

(17) In the third embodiment, the fastening member 54 is fastened to the joint body 53 by operating the operating lever 56. The sleeve which is integrated with the fastening member 54 is cut off from the fastening member 54, and bites into the outer periphery of the pipe 12, whereby the pipe 12 is joined to the joint body 53. Therefore, even when no screwing structure is adopted between the joint body 53 and the fastening member 54, the same advantages as the advantages (1), (2) and (4) to (12) of the first embodiment are obtained.

Fourth Embodiment

Next, a fourth embodiment of the pipe joint according to the present invention will be described with reference to FIGS. 8(a) to 8(c). As in the case of the third embodiment, the pipe joint according to the fourth embodiment is designed so that the fastening member is slid in the axial direction of the pipe at the pipe joining operation. The overlapping description of the same constructions as the first embodiment such as the construction that the sleeve bites into the outer peripheral surface of the pipe, etc., is omitted or simplified.

Figure 8A:
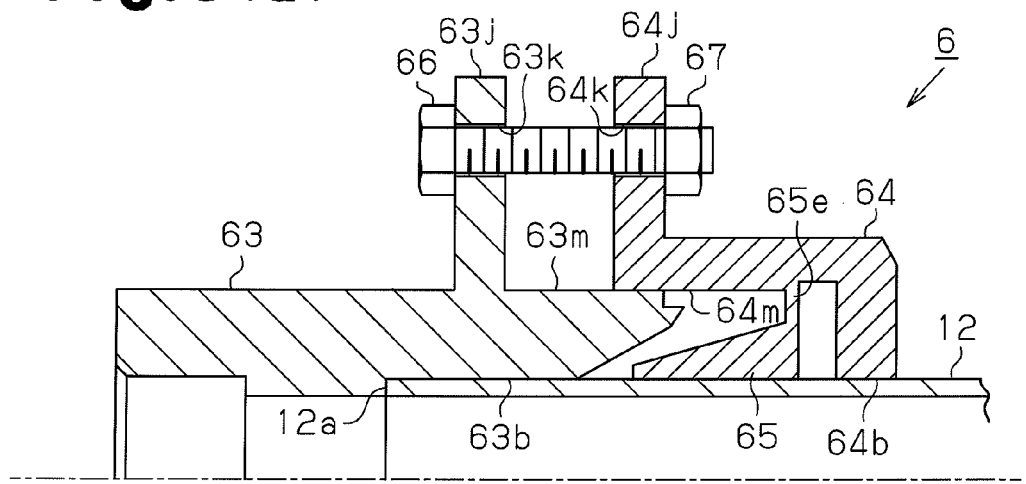
FIG. 8(a) is a cross-sectional view showing a state before a sleeve according to a fourth embodiment is cut off.
Figure 8B:
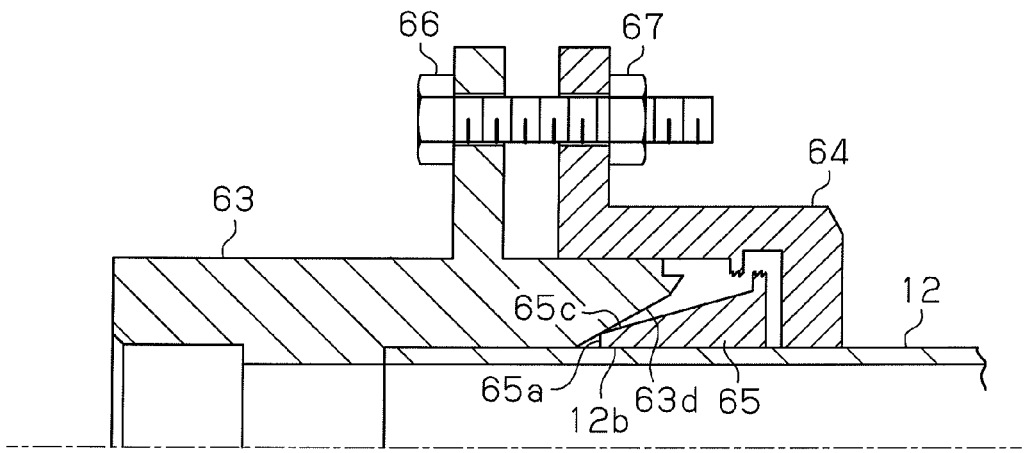
FIG. 8(b) is a cross-sectional view showing a state after the sleeve is separated.
Figure 8C:
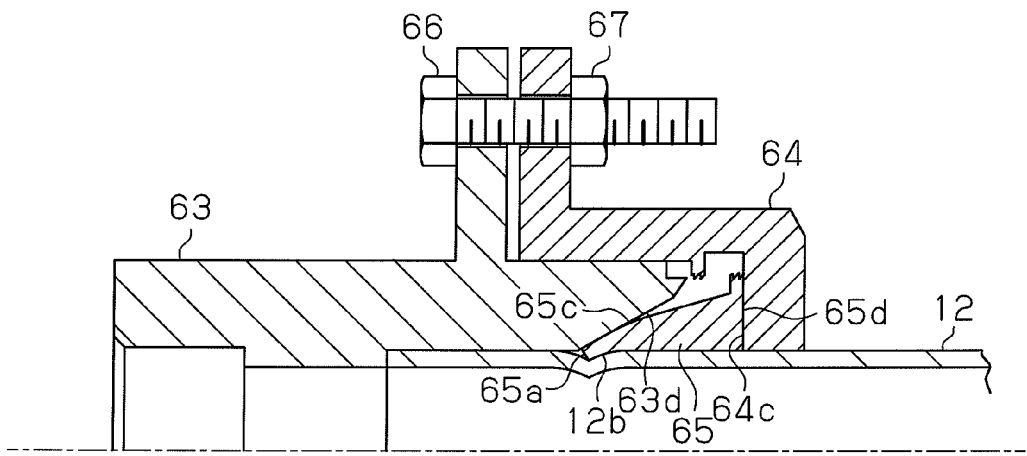
FIG. 8(c) is a cross-sectional view showing a state when the sleeve bites into a pipe.

FIGS. 8(a) to 8(c) are cross-sectional views showing the operation of the pipe joint 6 when the pipe 12 is joined to the joint body 63. FIG. 8(a) shows a state before the pipe 12 is connected by the pipe joint 6. As shown in FIG. 8(a), the pipe joint 6 has a joint body 63 in which the pipe 12 is inserted, a fastening member 64 to be fastened to the joint body 63, and a sleeve 65 biting into the outer peripheral surface of the pipe 12. The sleeve 65 is integrally formed with the fastening member 64, and the sleeve 65 and the fastening member 64 are joined to each other through a base portion 65e.

A plurality of flange portions 63j are formed on the outer peripheral surface of the joint body 63. A coupling hole 63k extending along the fastening direction of the fastening member 64 is formed in each flange portion 63j. A flange portion 64j is formed so as to face each flange portion 63j of the joint body 63 on the outer peripheral surface of the fastening member 64. A coupling hole 64k is formed in each flange portion 64j so as to be coaxial with the coupling hole 63k. A sliding face 63m having a circular shape is formed on the outer peripheral surface of the proximal portion of the joint body 63. A sliding face 64m having a circular shape is formed on the inner peripheral surface of the distal portion of the fastening member 64. When the fastening member 64 is fastened to the joint body 63, the sliding face 63m is fitted to the sliding face 64m. The fastening member 64 is designed so as to be movable only in the axial direction of the joint body 63.

Next, the pipe connecting method for joining the pipe 12 to the joint body 63 by using the pipe joint 6 will be described. When the pipe 12 is joined to the joint body 63, the pipe 12 is first inserted into the holding hole 64b of the fastening member 64, and the distal portion 12a of the pipe 12 is inserted into the joint hole 63b of the joint body 63. Then, as shown in FIG. 8(a), a bolt 66 is inserted into the coupling hole 63k of the joint body 63 and the coupling hole 64k of the fastening member 64, and the nut 67 is fastened to the bolt 66.

When the nut 67 is fastened, the fastening member 64 is moved to the joint body 63, so that the guide face 63d of the joint body 63 abuts against a part of the outer peripheral surface 65c of the sleeve 65 and the pressing force thereof increases as the fastening member 64 moves. Accordingly, at the base portion 65e of the sleeve 65, the shearing force applied in the moving direction of the fastening member 64 increases, and the base portion 65e of the sleeve 65 is cut off. Then, as shown in FIG. 8(b), the fastening member 64 and the sleeve 65 are separated from each other.

When the nut 67 is further fastened, the fastening member 64 is further moved to the joint body 63, so that the guide face 63d of the joint body 63 abuts against a part of the outer peripheral surface 65c of the sleeve 65, and also the contact portion 64c of the fastening member 64 abuts against the proximal end face 65d of the sleeve 65. Then, in accordance with the movement of the fastening member 64, the proximal end face 65d of the sleeve 65 receives pressing force from the contact portion 64c of the fastening member 64, and the outer peripheral surface 65c of the sleeve 65 is guided by the guide face 63d of the joint body 63, whereby the distal portion 65a of the sleeve 65 bites into the outer peripheral surface 12b of the pipe 12 as shown in FIG. 8(c).

As described above, according to the pipe joint 6, the distal portion 65a of the sleeve 65 bites into the outer peripheral surface 12*b* of the pipe 12, whereby the pipe 12 is joined to the joint body 63 while ensuring the sealing performance between the pipe 12 and the joint body 63.

The fourth embodiment described above has the following advantages.

(18) In the fourth embodiment, the nut 67 is fastened to the bolt 66, whereby the fastening member 64 is fastened to the joint body 63. The sleeve 65 which is integrated with the fastening member 64 is cut off from the fastening member 64 and bites into the outer periphery of the pipe 12, so that the pipe 12 is joined to the joint body 63. Therefore, the same advantages as the advantages (1), (2) and (4) to (12) of the first embodiment are obtained without using the screwing structure between the joint body 63 and the fastening member 64.

Each of the embodiments may be modified as follows.

In the first, third, and fourth embodiments, the sleeve 15 is integrally formed with the nut 14. However, the present invention is not limited to this construction. The sleeve 15 may be joined to the nut 14 by adhesion, fitting or other methods. Furthermore, in the second embodiment, the sleeve 25 is joined to the joint body 23 by adhesion, fitting or other methods and integrated with the joint body 23. However, the present invention is not limited to this construction, and the sleeve 25 may be integrally formed with the nut 24.

In the first and second embodiments, the cut surfaces 14*d*, 15*f* and the joint faces 23*h*, 25*h* are formed along the screwing direction of the nuts 14, 24. However, this invention is not limited to this structure, and the cut surfaces 14*d*, 15*f* and the joint faces 23*h*, 25*h* may be formed along a direction other than the screwing direction of the nuts 14, 24 as long as the sleeves 15, 25 are easily cut off and separated.

In the first and second embodiments, the cut surfaces 14*d*, 15*f* and the joint faces 23*h*, 25*h* are distant from the joint bodies 13, 23 or the nuts 14, 24 during the period from the time when the sleeves 15, 25 are separated until the time when the sleeves 15, 25 bite into the pipe 12. However, the present invention is not limited to this construction, and the cut surfaces 14*d*, 15*f* and the joint faces 23*h*, 25*h* may be brought into contact with the joint bodies 13, 23 or the nuts 14, 24 as long as the sleeves 15, 25 sufficiently bite into the pipe 12.

In the first to fourth embodiments, the distal portions 15*a*, 25*a*, 55*a*, 65*a* of the sleeves 15, 25, 55, 65 bite into the outer peripheral surface 12*b* of the pipe in the joining operation of the pipe 12. However, the present invention is not limited to this construction, and a site other than the distal portion 15*a*, 25*a*, 55*a*, 65*a* of the sleeve 15, 25, 55, 65 may bite into the outer peripheral surface 12*b* of the pipe 12.

In the first to fourth embodiments, the distal end of the distal portion 15*a*, 25*a*, 55*a*, 65*a* biting into the pipe 12 has a sharp-edge shape. However, the present invention is not limited to this construction, and the distal end of the distal portion 15*a*, 25*a*, 55*a*, 65*a* may have a shape other than the sharp-edge shape as long as the sealing performance at the biting site of the sleeve 15, 25, 55, 65 into the pipe 12 is ensured.

In the first to fourth embodiments, the inclination angle $\beta$ of the outer peripheral surface 15*c*, 25*c*, 55*c*, 65*c* is set to be smaller than the inclination angle $\alpha$ of the guide face 13*d*, 23*d*, 53*d*, 63*d*, and also it is set to be larger than the half angle of the inclination angle $\alpha$. However, the present invention is not limited to this construction, and the inclination angle $\alpha$ and the inclination angle $\beta$ may be set to have a relationship other than the above relationship in consideration of the friction coefficient between the outer peripheral surface and the guide face or the like.

In the first to fourth embodiments, the sleeve 15, 25, 55, 65 is formed of the material the hardness of which is equal to or higher than the hardness of the material of which the pipe 12 is formed. However, the present invention is not limited to this construction, and the sleeve 15, 25, 55, 65 may be formed of a material the hardness of which is lower than that of a material of which the pipe 12 is formed as long as the sealing performance at the biting site of the sleeve 15, 25, 55, 65 into the pipe 12 is ensured.

In the first to fourth embodiments, the pipe 11 inserted into the socket portion of the joint body is fixed to the joint body by brazing, and the pipe 12 inserted into the joint hole is joined to the joint body by the fastening of the sleeve or the fastening member. However, the present invention is not limited to this construction, and the pipes located at both distal portion and proximal portion of the joint body may be joined to the joint body by the fastening of the sleeve or the fastening member.

Figure 9:
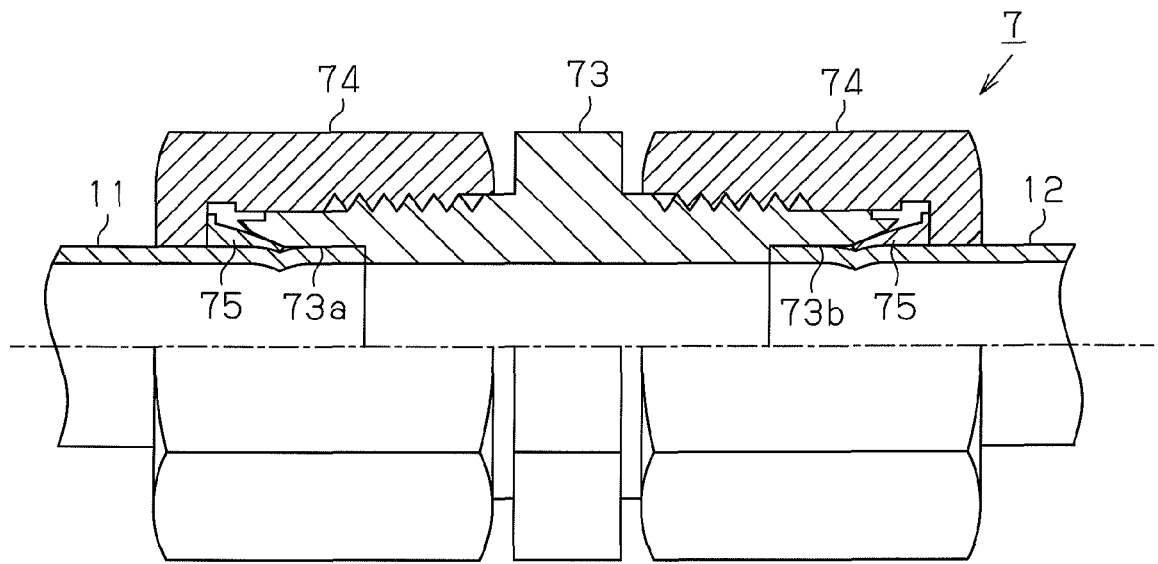
FIG. 9 is a partial cross-sectional view showing a pipe joint using the construction according to a first embodiment at both ends thereof.

FIG. 9 is a partial cross-sectional view showing the pipe joint 7 in which the construction of the first embodiment is applied to both distal portion and proximal portion of the joint body. Joint holes 73*a* and 73*b* are provided at the distal portion and proximal portion of the joint body 73, and the pipes 11, 12 are inserted into the joint holes 73*a*, 73*b*. The sleeve 75 which is integrated with the nut 74 is cut off from the nut 74 and bites into the outer peripheries of the pipes 11 and 12 by the thread engagement between the nut 74 and the joint body 73, whereby the pipes 11 and 12 are joined to the joint body 73. According to this construction, for example, in a case where equipment disposed on the pipes 11, 12 is replaced when the pipes 11 and 12 are cut at a construction site to replace the equipment and then the cut pipes 11 and 12 are re-connected to each other by using the pipe joint 7, the pipes 11 and 12 are safely and easily connected to each other without using any facilities for brazing.

Figure 10:
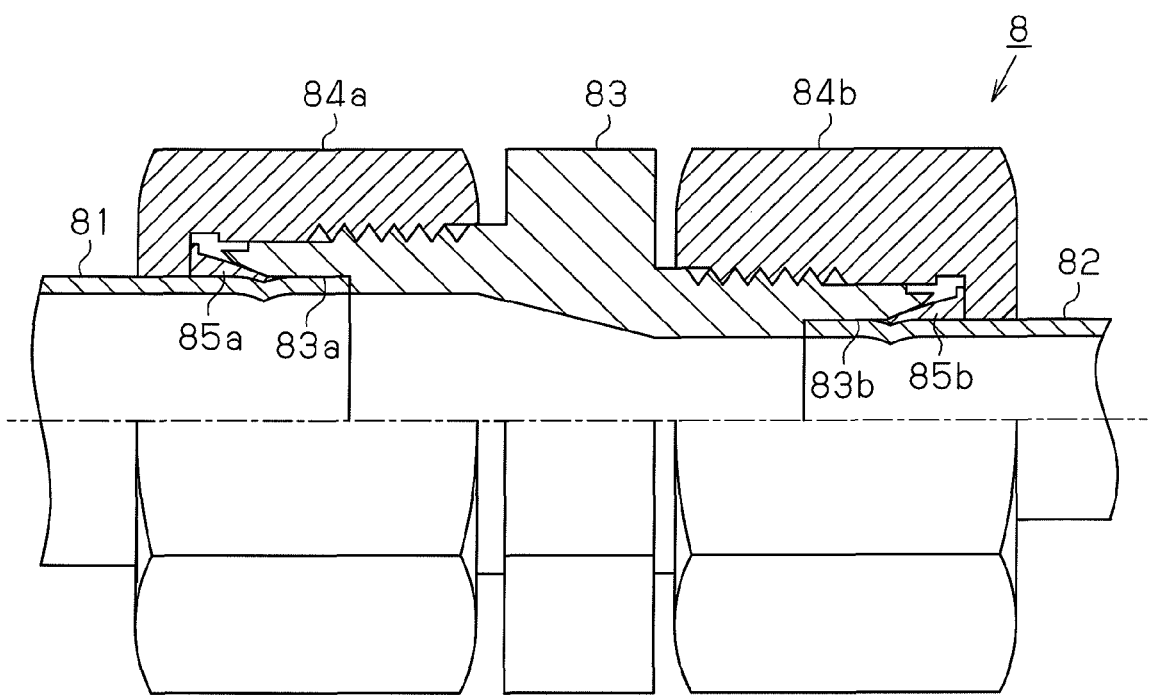
FIG. 10 is a partial cross-sectional view showing a pipe joint for connecting pipes different in outer diameter by using the construction according to the first embodiment at both ends thereof.

Furthermore, the respective pipes different in outer diameter may be connected to the distal portion and proximal portion of the pipe joint. FIG. 10 is a partial cross-sectional view showing the pipe joint 8 in which respective pipes different in outer diameter are constructed to be connectable to each other by using the construction of the first embodiment for the distal portion and proximal portion of the pipe joint. A pipe 81 is inserted into a joint hole 83*a* formed at the distal portion of a joint body 83. The inner diameter of the joint hole 83*b* formed at the proximal portion of the joint body 83 is set to be smaller than the inner diameter of the joint hole 83*a*. A pipe 82 having an outer diameter smaller than the outer diameter of the pipe 81 is inserted into the joint hole 83*b*. Sleeves 85*a* and 85*b* which are integrated with nuts 84*a* and 84*b* respectively are cut off from the nuts 84*a* and 84*b* and bite into the outer peripheral surfaces of the pipes 81 and 82 by the thread engagement between the nuts 84*a* and 84*b* and the joint body 83. Then, the pipes 81, 82 are joined to the joint body 83. In this construction, the pipe joint 8 is preferably used when the diameters of the pipes 81, 82 are selectively determined in accordance with the flow amount of fluid flowing through the pipes 81, 82 or the like.

Figure 11:
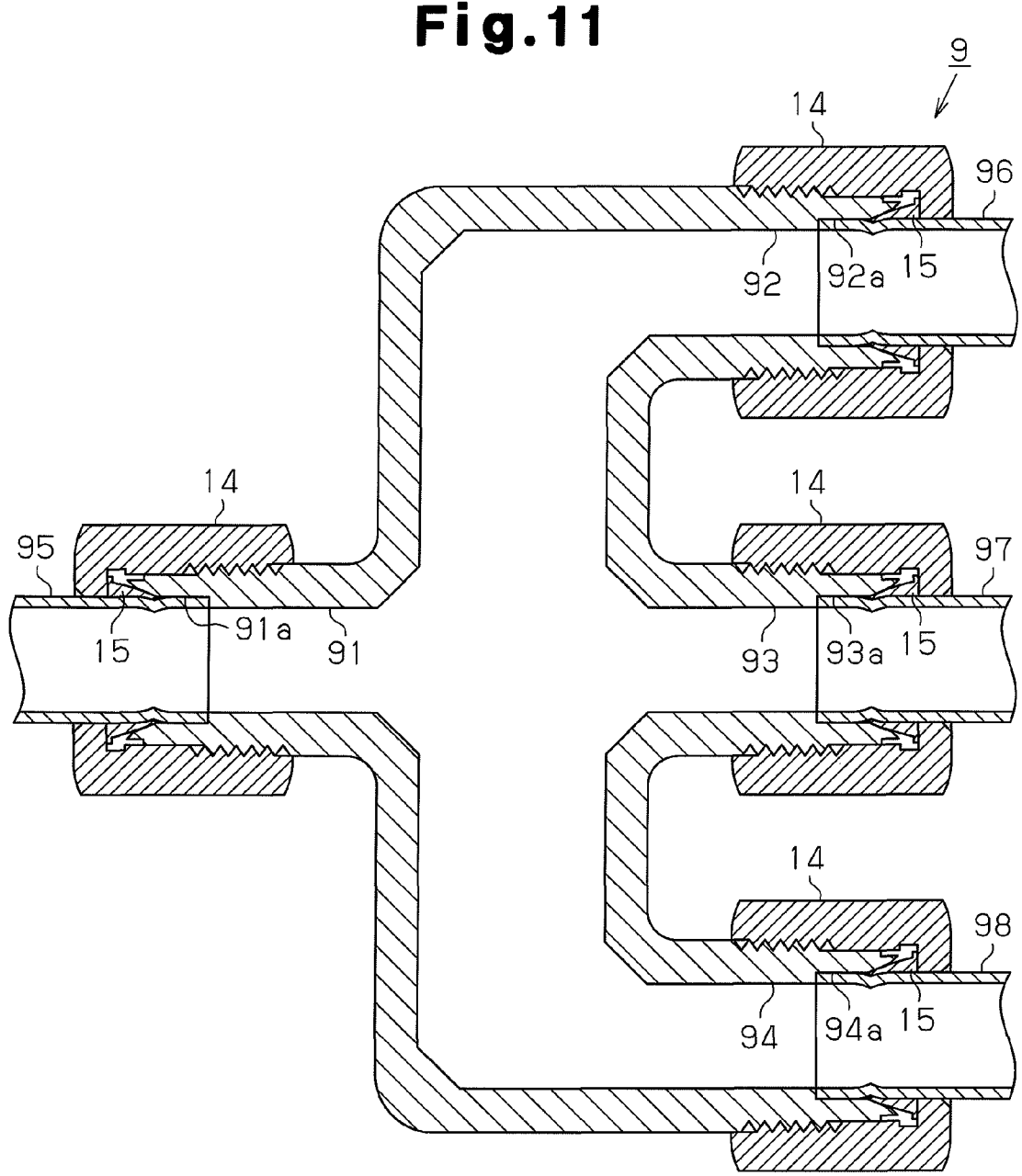
FIG. 11 is a cross-sectional view showing a pipe joint for connecting a plurality of pipes by using the construction according to the first embodiment.

In the first to fourth embodiments, the pipe joint is designed so that two pipes 11 and 12 are connected to each other. However, the present invention is not limited to this construction, and three or more pipes may be connected to one another. FIG. 11 is a cross-sectional view showing a pipe joint in which four pipes are connected to one another by using the construction of the first embodiment. The pipe joint 9 is designed so that fluid flowing from a first port 91 is branched to second to fourth ports 92, 93, 94. Pipes 95, 96, 97, 98 are inserted into joint holes 91*a*, 92*a*, 93*a*, 94*a* formed at each of the ports, respectively. The respective pipes 95, 96, 97, 98 are joined to the respective ports 91, 92, 93, 94 by the nut 14 and the sleeve 15 of the pipe joint 1 according to the first embodiment. In this construction, when a plurality of indoor units are connected to an outdoor unit of an air conditioner, the pipe joint 9 is suitably used at a place where refrigerant is branched or confluent. In the pipe joint in which a plurality of pipes are connected to one another, at least one pipe is connected by the construction of the first embodiment, and all the pipes may be connected by the construction of the first embodiment.

Figure 12:
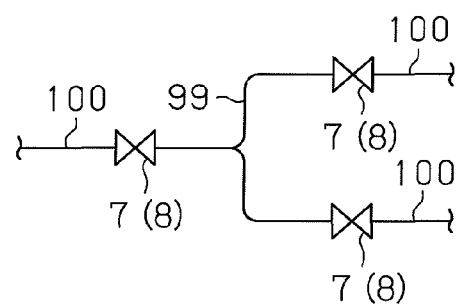
FIG. 12 is a diagram showing a connection state of a plurality of pipes and a branch pipe.

Furthermore, when three or more pipes are connected, the pipe joint of the first to fourth embodiments or the pipe joints 7, 8 may be used together with a branch pipe by which the flow path is branched to a plurality of paths. FIG. 12 is a diagram showing a connection state between a branch pipe 99 and pipes 100. The branch pipe 99 is designed so that the flow path is branched to a plurality of paths, and the end portions of the branch pipe 99 are connected to the pipes 100 by the pipe joints 7, 8, respectively. In this construction, the pipes 100 are branched or the pipes 100 join together while ensuring the sealing performance at the joint portion of the pipes 100. In a case where the construction of the pipe is changed so that fluid flowing in the pipe is branched or confluent, the branch pipe 99 and the pipe joints 7, 8 are suitably used when a pipe is cut at a construction site to dispose a branch pipe and then a pipe to be newly connected, the cut pipe and the branch pipe are connected.

In the first to fourth embodiments, the type of fluid flowing through the pipe is not particularly limited. A pipe through which supercritical refrigerant used under a supercritical state flows may be connected by the pipe joint of the first to fourth embodiments. In this construction, even when high pressure is applied to the joint portion between the pipe joint and the pipe because supercritical refrigerant used under the supercritical state flows into the pipe, the sealing performance at the joint portion between the pipe joint and the pipe is ensured, so that the leakage of refrigerant at the joint portion is suitably prevented.

Furthermore, a pipe through which carbon dioxide refrigerant flows may be connected by the pipe joint according to the first to fourth embodiment. In this construction, fluid flowing in the pipe to be connected is carbon dioxide refrigerant, and thus a pipe circuit using the pipe joint is constructed in consideration of the global environment. Furthermore, even when carbon dioxide refrigerant is used under the supercritical state and thus high pressure is applied to the joint portion between the pipe joint and the pipe, the sealing performance of the joint portion between the pipe joint and the pipe is ensured, so that leakage of the refrigerant at the joint portion is suitably prevented.

Still furthermore, a pipe through which hydrocarbon refrigerant flows may be connected by the pipe joint of the first to fourth embodiment. In this construction, the fluid flowing in the pipe to be connected is hydrocarbon refrigerant such as propane, isobutene or the like, and thus the pipe circuit using the pipe joint is constructed in consideration of the global environment. Furthermore, the sealing performance at the joint portion between the pipe joint and the pipe is ensured, and thus leakage of hydrocarbon refrigerant having a high inflammability from the joint portion is suitably prevented.

Figure 13:
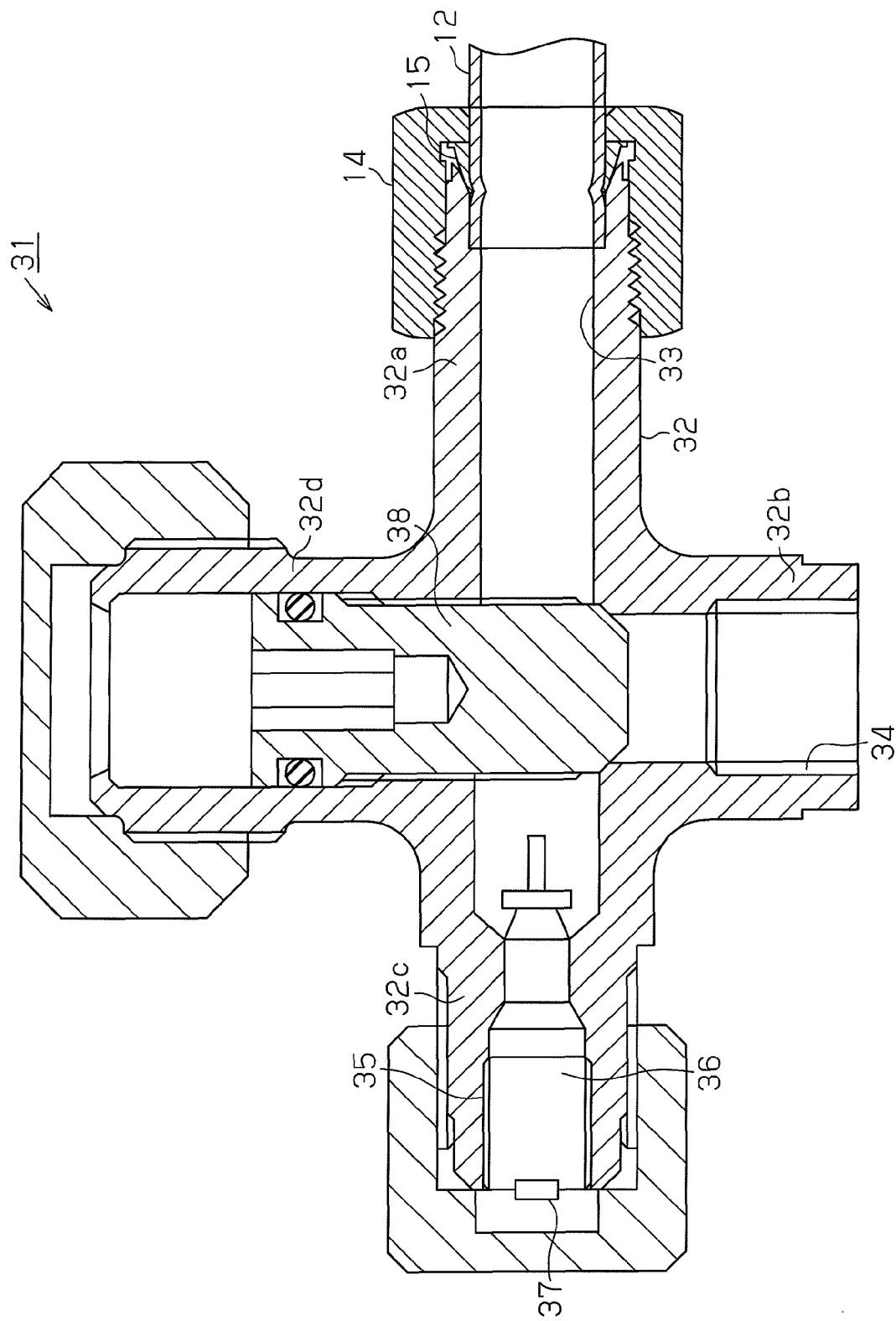
FIG. 13 is a cross-sectional view showing a closing valve using a pipe joint according to the present invention.

In the first to fourth embodiments, the pipe joint is used to connect the pipe 11 and the pipe 12. However, the present invention is not limited to this construction, and the construction of the pipe joint may be used for a connecting portion of a closing valve which is disposed in a refrigerant pipe of an air conditioner, for example. FIG. 13 is a cross-sectional view showing a closing valve 31 using the construction of the pipe joint 1 according to the first embodiment. The closing valve 31 has a housing 32 including first to fourth cylinder portions 32a, 32b, 32c, 32d which are connected to one another substantially in a cross-like shape so that the end portions thereof communicate with one another. A first port 33 and a second port 34 to which a pipe is joined are formed in the first cylinder portion 32a and the second cylinder portion 32b, respectively. A service port 35 is formed in the third cylinder portion 32c. The closing valve 31 is designed to perform vacuuming of the inside of the pipe, charge refrigerant, etc., by operating a valve body 37 of a valve core 36. A substantially cylindrical valve body 38 is disposed in the fourth cylinder portion 32d, and the first port 33 and the second port 34 are made to communicate with each other or the communication therebetween is interrupted by operating the valve body 38. In the thus constructed closing valve 31, the construction of the pipe joint 1 of the first embodiment is applied to the first port 33. That is, the construction of the joint body 13 of the pipe joint 1 is used for the housing 32 of the closing valve 31, and the pipe 12 inserted into the first port 33 is joined by the nut 14 and the sleeve 15. Accordingly, the closing valve 31 having the advantages of the pipe joint described above is obtained.

Figure 14:
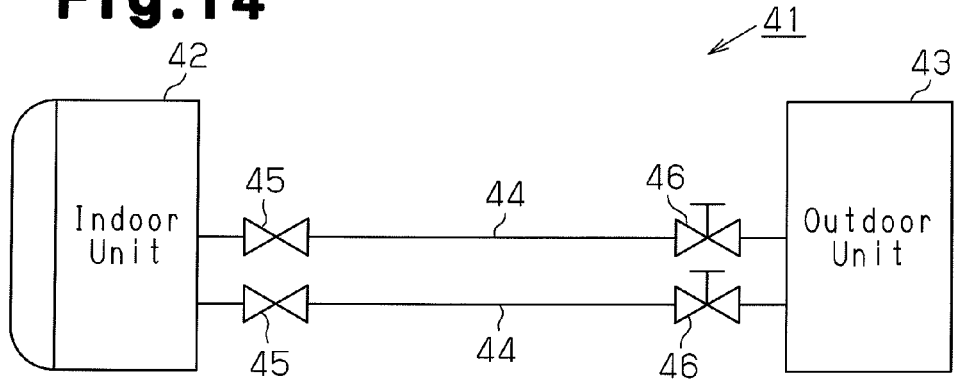
FIG. 14 is a diagram showing a connection state of refrigerant pipes between an indoor unit and an outdoor unit of an air conditioner.

In the first to fourth embodiments, the pipe 11 and the pipe 12 are connected to each other by the pipe joint, however, these constructions of the pipe joint may be applied to the connection portions 45, 46 of refrigerant pipes 44 through which an indoor unit 42 and an outdoor unit 43 of an air conditioner 41 as shown in FIG. 14 communicate with each other. In the air conditioner 41 as described above, the pipe joints of the first to fourth embodiments are used for the connection portions 45 to which the indoor unit 42 and the refrigerant pipes 44 are connected, thereby joining the refrigerant pipes 44. The closing valves 31 may be used for the connection portions 46 to which the outdoor unit 43 and the refrigerant pipes 44 are connected, thereby joining the refrigerant pipes 44. The pipes may be connected by using the pipe joint 7, 8 at some midpoint of the refrigerant pipe 44. When a plurality of indoor units 42 are provided, the pipe joint 9 may be used at some midpoint of the refrigerant pipe 44 so that the pipe is branched or pipes join together. The construction of the pipe joint of the first to fourth embodiment may be applied not only to the air conditioner 41, but also to the connection portion of a refrigerant pipe in another refrigeration device. Accordingly, a refrigeration device having the advantages of the pipe joint described above is obtained.

Figure 15A:
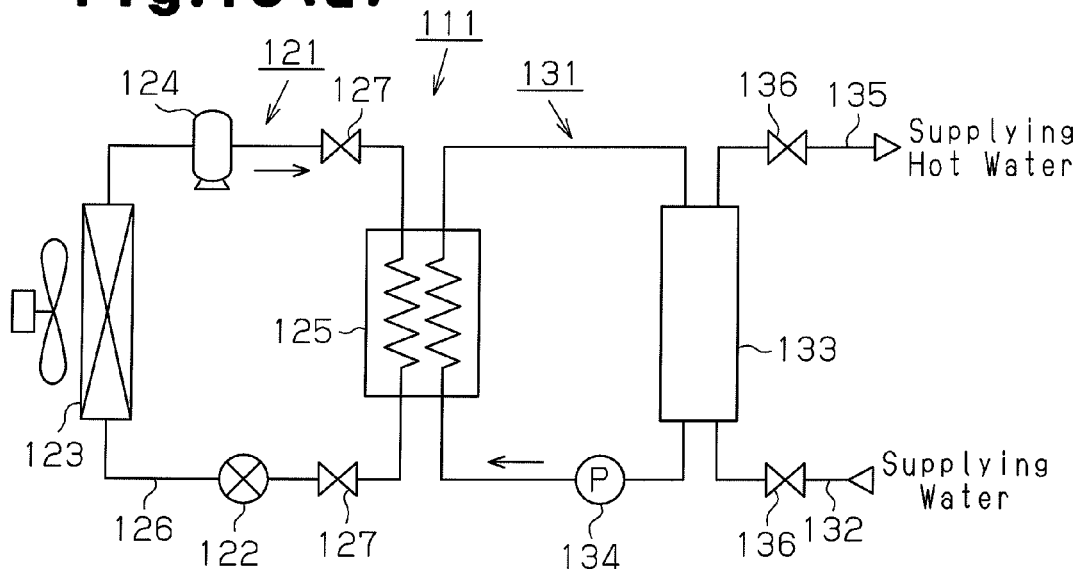
FIG. 15(a) is a diagram showing a connection state of pipes of a heat pump hot water supply device.
Figure 15B:
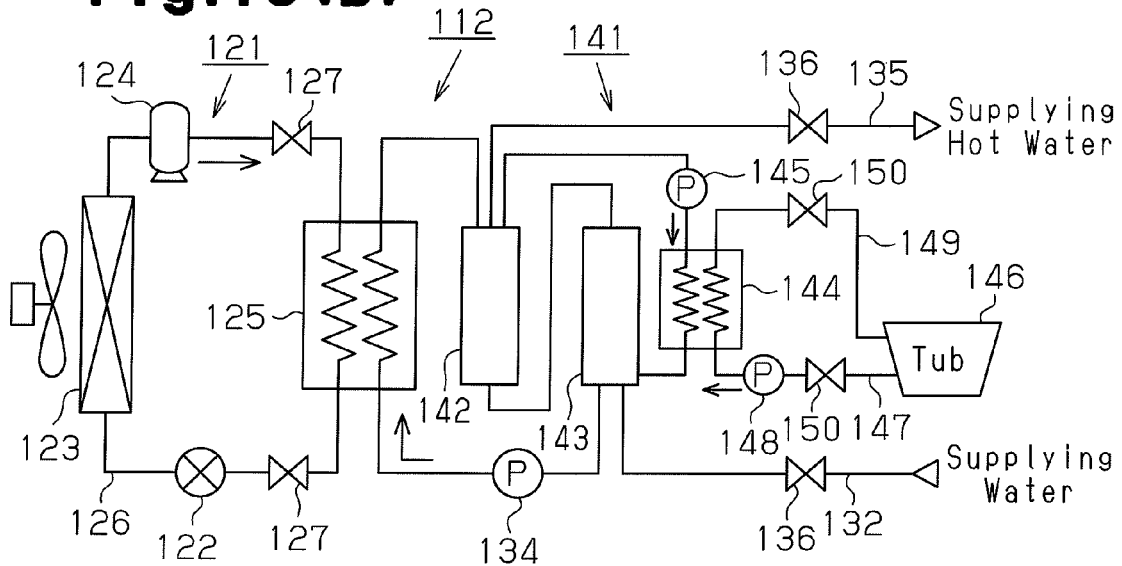
FIG. 15(b) is a diagram showing a connection state of pipes of a heat pump hot water supply device according to another example.
Figure 16:
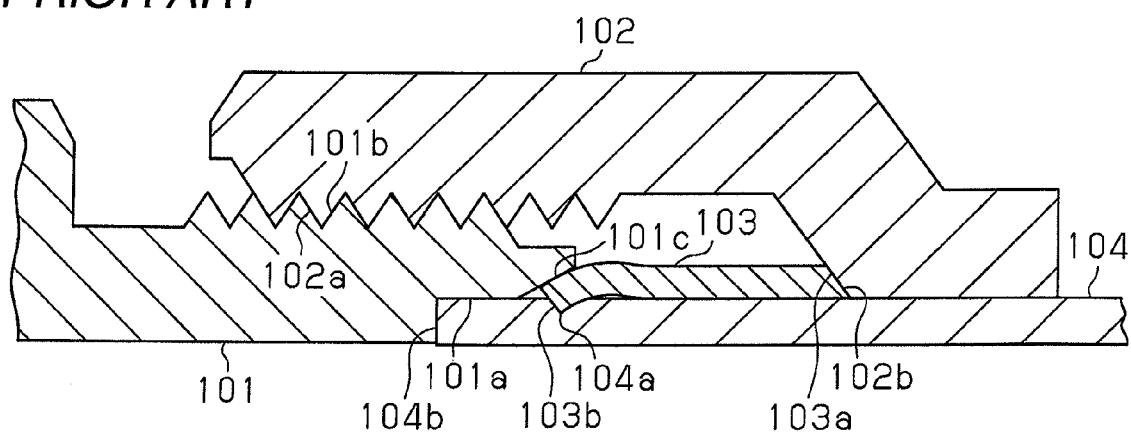
FIG. 16 is a cross-sectional view showing the construction of a pipe joint of a prior art.

The construction of the pipe joint of the first to fourth embodiments may be applied to the connection portion of the pipe of a heat pump hot water supply device. FIGS. 15(a) and 15(b) are diagrams showing connection states of pipes of the heat pump hot water supply device. FIG. 15(a) is a diagram showing the heat pump hot water supply device 111 having one tank. The heat pump hot water supply device 111 has a heat pump unit 121 for pumping up heat from the outside air, and a hot water storage unit 131 for supplying hot water by using the heat pumped up by the heat pump unit 121. The heat pump unit 121 includes a refrigeration cycle apparatus having an expansion valve 122, an air heat exchanger 123, a compressor 124, and a water heat exchanger 125. Refrigerant flows in the refrigerant pipe 126 to which each equipment is connected. The hot water storage unit 131 is constructed as follows. That is, water supplied to a tank 133 via a water supply piping 132 is circulated between the tank 133 and the water heat exchanger 125 by a pump 134. Hot water heat exchanged in the water heat exchanger 125 is supplied from the tank 133 via the water supply piping 135.

FIG. 15(b) is a diagram showing the heat pump hot water supply device 112 having two tanks. The heat pump hot water supply device 112 has the same construction as the heat pump hot water supply device 111. However, the first tank 142 and the second tank 143 corresponding to the tank of the hot water storage unit 141 are connected to each other in series. The heat pump hot water supply device 112 is added with an additional heating function constructed as follows. That is, hot water stored in the first tank 142 and a second tank 143 is circulated between the first and second tanks 142, 143 and an additional heating heat exchanger 144 by a pump 145. Hot water fed from a tub 146 via a water supply piping 147 to a pump 148 is subjected to heat exchange and warmed by the additional heating heat exchanger 144, and then returned to the tub 146 via the water supply piping 149.

In the heat pump hot water supply devices 111, 112 as described above, the pipe joint of the first to fourth embodiments is used for the connection portion 127 provided to the refrigerant pipe 126 and the connection portion 136 provided to the water supply pipings 132, 135, for example. In addition, in the heat pump hot water supply device 112, the pipe joint of the first to fourth embodiments may be used for the connection portion 150 provided to the water supply piping 147, 149. Accordingly, the heat pump hot water supply device 111, 112 having the advantages of the pipe joint described above is obtained. The connection portion 127, 136, 150 may be provided at another position in accordance with the arrangement of the equipment and the units constituting the heat pump hot water supply device. As described above, in addition to the connection portion of the refrigerant pipe, the pipe joint may be applied to the connection portion of the water supply piping in which water flows. Furthermore, the pipe joint may be applied to the connection portion of a water supply piping formed of resin.

Still furthermore, a piping work may be carried out at a job site of the air conditioner 41 or the heat pump hot water supply device 111, 112 by using the pipe connecting method described in the first to fourth embodiments. When the piping work is carried out by using the pipe joint, the pipes may be connected by the fastening operation of the fastening member into the joint body or the like, and thus an in-the field piping method for constructing pipes safely and easily is provided without using any facilities for brazing, etc.

What is claimed is:

1. A pipe joint comprising:
    a joint body having a joint hole configured to receive a pipe therein;
    a fastening member fastened to the joint body; and
    a sleeve having a distal portion biting into an outer periphery of the pipe when the fastening member is fastened to the joint body and the pipe is received in the joint hole, the sleeve being non-movably integrated with one of the joint body and the fastening member prior to the fastening member being fastened to the joint body, and the sleeve having an annular shape with a radial thickness t at the distal portion of the sleeve,
    the sleeve, the joint body and the fastening member being arranged and configured such that the sleeve is separated from the one of the joint body and the fastening member when the fastening member is fastened to the joint body,
    the sleeve being a separate member from the joint body and the fastening member, the sleeve being non-movably joined to the one of the joint body and the fastening member prior to the fastening member being fastened to the joint body, and
    an outer diameter Dp of the pipe, and an inner diameter D0 of the joint hole of the joint body satisfy the relationship $$0.02 < \{Dp - (D0 - 2t)\}/Dp < 0.1.$$

2. The pipe joint according to claim 1, wherein the joint body includes a threaded portion, and the fastening member is threadedly coupled to the threaded portion to be fastened to the joint body.

3. The pipe joint according to claim 1, wherein the fastening member has a cylindrical shape, and the sleeve is integrated with the fastening member on an inner surface of the fastening member such that a distal end of the sleeve is located within the fastening member.

4. The pipe joint according to claim 1, wherein the fastening member moves in a fastening direction relative to the joint body when fastened to the joint body to cut off and separate the sleeve from the one of the joint body and the fastening member such that a cut surface is generated on the sleeve and the one of the joint body and the fastening member, the cut surfaces extending in substantially the same direction as the fastening direction of the fastening member.

5. The pipe joint according to claim 1, wherein the fastening member moves relative to the joint body when fastened to the joint body to cut off and separate the sleeve from the one of the joint body and the fastening member such that a cut surface is generated on the sleeve and the one of the joint body and the fastening member, the cut surfaces being spaced from the other of the joint body and the fastening member when the fastening member is fastened to the joint body and the sleeve bites into the pipe.

6. The pipe joint according to claim 1, wherein the sleeve is formed of a material having a hardness which is equal to or higher than a hardness of a material of which the pipe is formed.

7. The pipe joint according to claim 1, wherein the sleeve has a distal end with a sharp-edge shape at a site where the sleeve bites into the pipe.

8. The pipe joint according to claim 1, wherein the joint hole has an inner guide face expanding in diameter as the guide face extends outwardly from inside to the joint body,
    the sleeve has an annular shape and an outer guided face expanding in diameter as the guided face extends away from a distal end of the sleeve, and
    the guide face presses the guided face when the fastening member is fastened to the joint body such that the sleeve bites into the pipe.

9. The pipe joint according to claim 8, wherein an inclination angle of the outer guided face with respect to a line extending along a fastening direction of the fastening member is smaller than an inclination angle of the inner guide face with respect to the line.

10. The pipe joint according to claim 9, wherein the inclination angle of the outer guided face is larger than the one-half of the inclination angle of the inner guide face.

11. The pipe joint according to claim 1, wherein the joint body has a plurality of joint holes for joining a plurality of pipes, and a pipe inserted into at least one of the joint holes is joined by the biting of the sleeve into the pipe.

12. The pipe joint according to claim 11, wherein the joint body has two joint holes for joining two pipes, the pipe inserted into one joint hole is joined by the biting of the sleeve into the pipe, the pipe inserted into the other joint hole is joined by brazing.

13. The pipe joint according to claim 11, wherein
the joint body has two joint holes for joining two pipes, and the pipes inserted into both joint holes are joined to the joint body by the biting of the sleeve into the pipes.

14. The pipe joint according to claim 11, wherein
the joint holes have at least two different inner diameters such that pipes having at least two different outer diameters are joined to the joint body.

15. The pipe joint according to claim 1, further comprising a pipe joined to the joint body, which is a branch pipe having a flow path branched to a plurality of paths.

16. The pipe joint according to claim 1, further comprising a pipe in which supercritical refrigerant used under a supercritical state flows is connected.

17. The pipe joint according to claim 1, further comprising a pipe in which carbon dioxide refrigerant flows is connected.

18. The pipe joint according to claim 1, further comprising a pipe in which hydrocarbon refrigerant flows is connected.

19. A refrigeration device including the pipe joint of claim 1, wherein
the pipe joint is used as a connection portion of a refrigerant pipe.

20. A heat pump hot water supply device including the pipe joint of claim 1, wherein
the pipe joint is used as a connection portion of a refrigerant pipe.

21. A closing valve including the pipe joint of claim 1, wherein
the pipe joint is used as a connection portion of a pipe.

22. A water supply piping including the pipe joint of claim 1, wherein
the pipe joint is used as a connection portion of a pipe.

23. The pipe joint according to claim 1, wherein
the sleeve has a first contact surface,
an other one of the joint body and the fastening member not having the sleeve non-movably integrated therewith has a second contact surface arranged to contact the first contact surface when the fastening member is fastened to the joint body, and
the first and second contact surfaces are arranged perpendicularly relative to a longitudinal center axis of the pipe joint such that an axial force is applied to the first contact surface from the second contact surface when the fastening member is fastened to the joint body to separate the sleeve from the one of the joint body and the fastening member when the fastening member is fastened to the joint body.

24. A method for connecting piping comprising:
providing a pipe joint, which includes
a joint body having a joint hole,
a fastening member arranged and configured to be fastened to the joint body, and
a sleeve non-movably integrated with one of the joint body and the fastening member,
the sleeve being a separate member from the joint body and the fastening member, the sleeve being non-movably joined to the one of the joint body and the fastening member prior to the fastening member being fastened to the joint body,
the sleeve having an annular shape with a radial thickness t at a distal portion of the sleeve, and
an outer diameter Dp of the pipe, and an inner diameter D0 of the joint hole of the joint body satisfy the relationship
$0.02 < \{Dp-(D0-2t)\}/Dp < 0.1$;
inserting a pipe into the joint hole of the joint body; and
performing a fastening operation to fasten the fastening member to the joint body,
the sleeve being separated from the one of the joint body and the fastening member during the fastening operation of the fastening member to the joint body, and
the distal portion of the sleeve biting into an outer periphery of the pipe during the fastening operation of the fastening member to the joint body.

25. An in-the field piping method including the method for connecting piping according to claim 24, wherein
a piping work is carried out at a job site of the piping work by using the method for connecting piping.

26. The method for connecting piping according to claim 24, wherein
the sleeve of the pipe joint has a first contact surface,
an other one of the joint body and the fastening member of the pipe joint not having the sleeve non-movably integrated therewith has a second contact surface arranged to contact the first contact surface when the fastening member is fastened to the joint body, and
the first and second contact surfaces are arranged perpendicularly relative to a longitudinal center axis of the pipe joint such that an axial force is applied to the first contact surface from the second contact surface when the fastening member is fastened to the joint body to separate the sleeve from the one of the joint body and the fastening member when the fastening member is fastened to the joint body.

* * * * *